(12) United States Patent
Allasia et al.

(10) Patent No.: US 8,588,076 B2
(45) Date of Patent: Nov. 19, 2013

(54) METHOD AND SYSTEM FOR PROVIDING USER ACCESS TO COMMUNICATION SERVICES, AND RELATED COMPUTER PROGRAM PRODUCT

(75) Inventors: Andrea Allasia, Turin (IT); Mario Ullio, Turin (IT); Vinicio Vercellone, Turin (IT)

(73) Assignee: Telecom Italia S.p.A., Milan (IT)

( * ) Notice: Subject to any disclaimer, the term of this patent is extended or adjusted under 35 U.S.C. 154(b) by 0 days.

(21) Appl. No.: 12/087,060

(22) PCT Filed: Dec. 28, 2005

(86) PCT No.: PCT/EP2005/014084
§ 371 (c)(1),
(2), (4) Date: Dec. 10, 2008

(87) PCT Pub. No.: WO2007/073761
PCT Pub. Date: Jul. 5, 2007

(65) Prior Publication Data
US 2009/0285090 A1 Nov. 19, 2009

(51) Int. Cl.
*H04J 3/14* (2006.01)
(52) U.S. Cl.
USPC .................................................... 370/236.2
(58) Field of Classification Search
USPC ........... 370/219, 221, 236.2, 352, 353, 354.1, 370/395.1; 455/404.1
See application file for complete search history.

(56) References Cited

U.S. PATENT DOCUMENTS 6,907,237 B1 * 6/2005 Dorenbosch et al. ...... 455/404.1
7,307,991 B2 * 12/2007 Kubota et al. ................ 370/392
2003/0002505 A1 * 1/2003 Hoch et al. ................... 370/392
2003/0037163 A1 2/2003 Kitada et al.
2004/0076160 A1 * 4/2004 Phaltankar ................ 370/395.1
2004/0136394 A1 7/2004 Onno et al.
2004/0193556 A1 9/2004 Miyamoto et al.
2006/0095597 A1 * 5/2006 Bai et al. .......................... 710/8
2006/0153068 A1 * 7/2006 Dally et al. .................. 370/219

FOREIGN PATENT DOCUMENTS

EP 1 437 860 7/2004

OTHER PUBLICATIONS

Li et al.; Cisco Hot Standby Router Protocol (HSRP), RFC 2281, The Internet Society, pp. 1-17, (1998).
Hinden; Virtual Router Redundancy Protocol (VRRP), RFC3768, The Internet Society, pp. 1-27, (2004).

(Continued)

*Primary Examiner* — Andrew Lai
*Assistant Examiner* — Leon Andrews
(74) *Attorney, Agent, or Firm* — Finnegan, Henderson, Farabow, Garrett & Dunner, L.L.P.

(57) ABSTRACT

A system for providing, to users of data communication services, access to a communication network providing these services includes an edge node as well as a packet network, such as an Ethernet connecting the users to the edge node. The packet network is equipped with operation and maintenance procedures for preserving edge connectivity over the packet network. The edge node is associated with a backup edge node, which also provides access to the communication network. Preferably, the backup edge node has the same address as the edge node such that, in the presence of failure of the edge node, seamless connection is established between the users and the backup edge node by applying the operation and maintenance procedures.

9 Claims, 27 Drawing Sheets

(56) References Cited

OTHER PUBLICATIONS

I. Minei et al.; "Protection and Restoration in MPLS Networtks" Chapter 3 of MPLS-Enabled Applications—Emerging Developments and New Technologies, John Wiley & Sons, Ltd., West Sussex, England pp. 69-72, (2005).

Sridhar et al.; "End-To-End Ethernet Connectivity Fault Management in Metro and Access Networks"; Alcatel Technology White Paper, pp. 1-12, (2005).

* cited by examiner

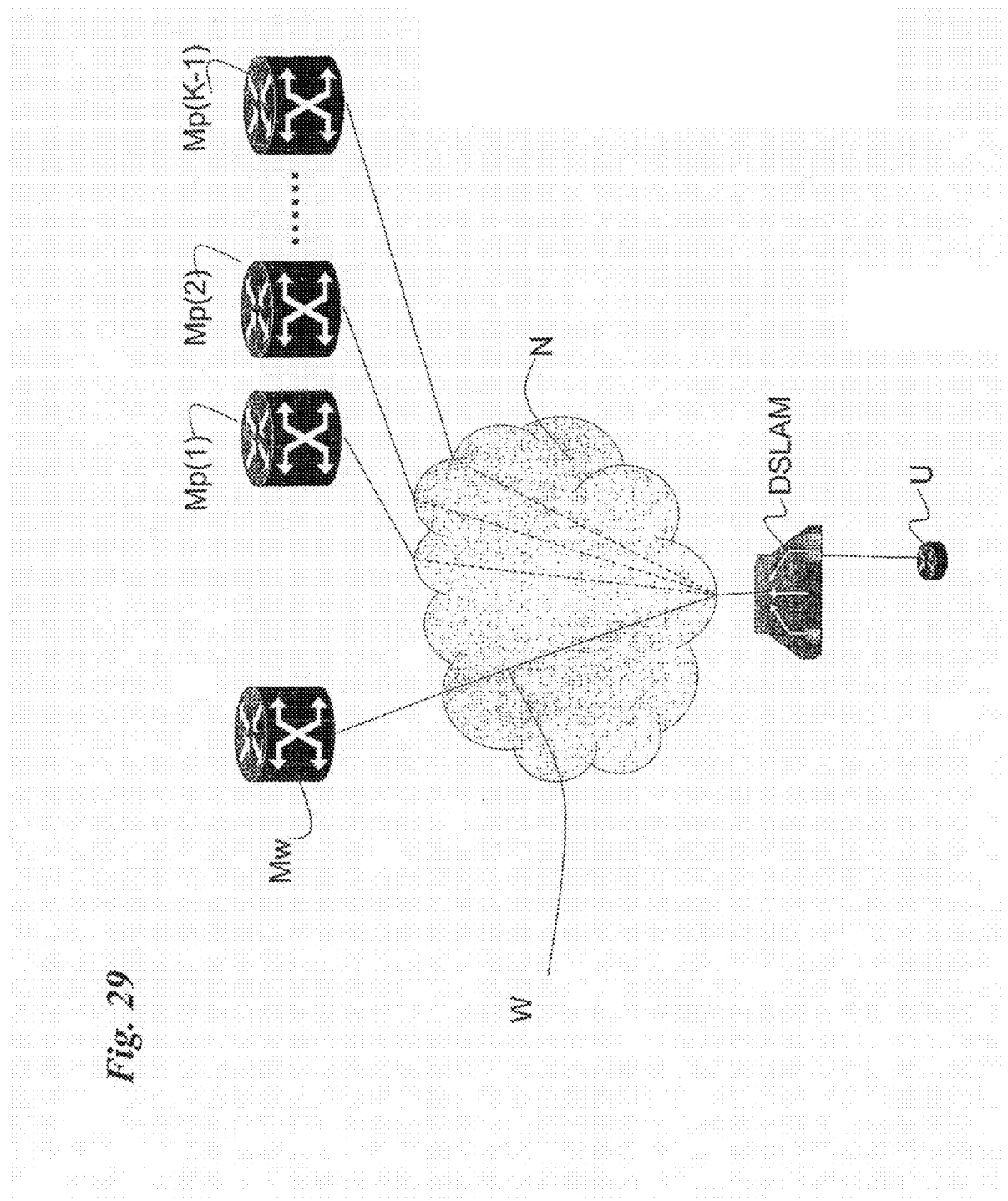

METHOD AND SYSTEM FOR PROVIDING USER ACCESS TO COMMUNICATION SERVICES, AND RELATED COMPUTER PROGRAM PRODUCT

CROSS REFERENCE TO RELATED APPLICATION

This application is a national phase application based on PCT/EP2005/014084, filed Dec. 28, 2005, the content of which is incorporated herein by reference.

FIELD OF THE INVENTION

The invention relates to techniques for providing user access to communication services, such as e.g. multimedia communication services.

DESCRIPTION OF THE RELATED ART

Modern data communication networks based on the Internet Protocol (IP) and currently referred to as IP networks constitute telecommunication infrastructures on which an increasing number of services and applications are intended to converge. Some of the communication services offered by these multi-service integrated networks, in particular voice (VoIP, Voice over IP), video communication, or video broadcasting services, require high levels of reliability and availability as well as solutions for ensuring protection and rapid re-establishment of service in case of faults.

In conventional broadband IP networks, where the service offered to the users essentially consists of Internet access, the users are typically connected on copper lines that use transmission techniques such as xDSL (Digital Subscriber Line) and are aggregated by nodes designated DSLAM (Digital Subscriber Line Access Multiplexer).

Figure 1:
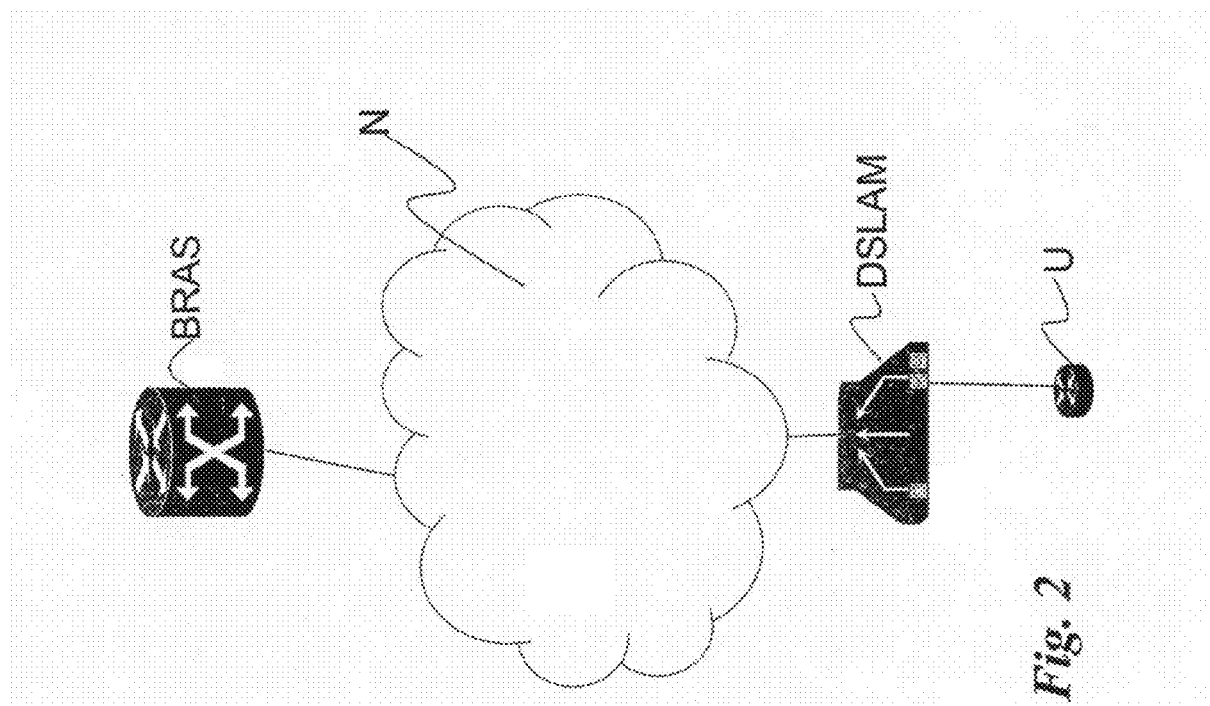
Figure 2:
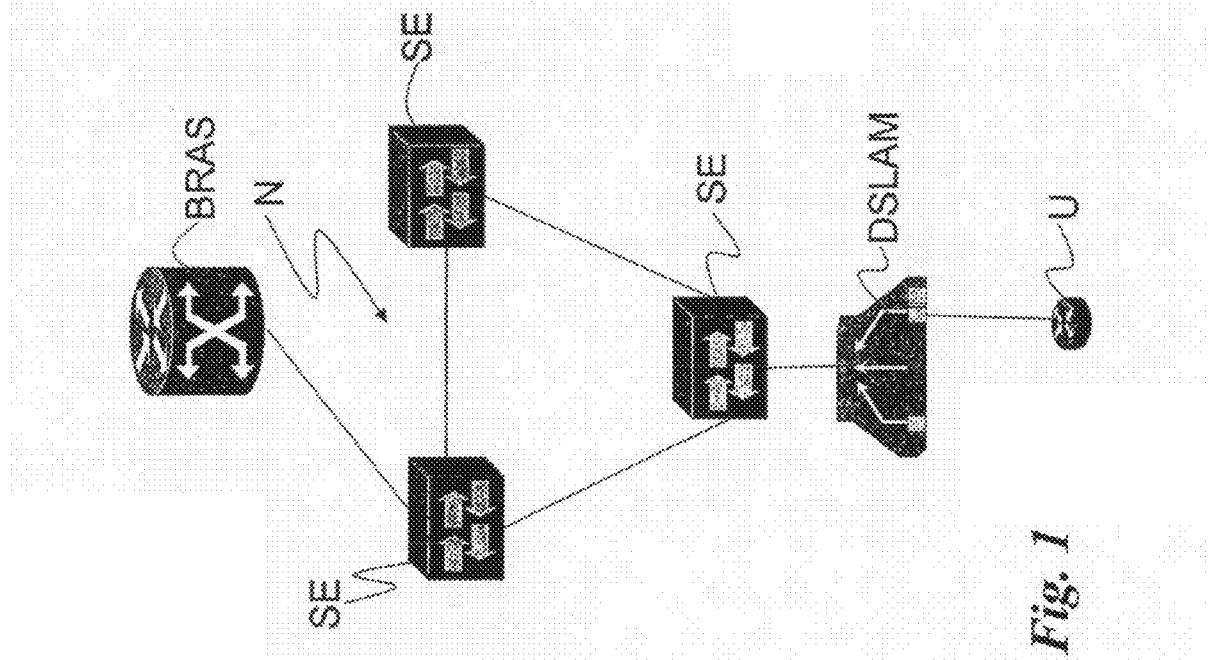

As schematically illustrated in FIGS. 1 and 2, the IP access service is supplied by specialized edge routers, designated BRAS (Broadband Remote Access Server). These systems terminate the access connections and realize the routing functions for the client traffic.

As shown in FIG. 2, in the typical network configuration used for offering this service, a network N based on the Ethernet technology is provided between the BRAS and the DSLAM modules to which the users U are connected. The network N is typically constituted by Ethernet layer 2 (L2) switches, designated as SE in FIG. 1. These provide traffic transport functionality between the BRAS and the DSLAM modules as well concentration of DSLAMs towards one or more BRAS modules. From the example shown in FIG. 1, it will be appreciated that, in order to provide reliable transport between the DSLAM and BRAS modules, two partially different paths are used. In a typical state-of-the art configuration, the Spanning Tree Protocol (STP) or any of its variants (for example, Rapid-STP) is used to guarantee that at any time only one of the possible connections between the BRAS and DSLAM modules is active and that, in case this connection is faulty, the network will be automatically reconfigured by making available a backup connection. In that respect, reference may be had to the IEEE 802.1D Standard.

Irrespective of any other remark, such a prior art arrangement constitutes a layer 2 (L2) protection mechanism, that is a protection mechanism which is not coordinated with possibly existing layer 1 (L1) and layer 3 (L3) protection mechanisms. In fact, some solutions are available for the management, at layer 3, of service protection in "dual-homing" configurations.

A first class of solutions is based on protocols known as First Hop Redundancy Protocols, e.g. HSRP (Hot Standby Redundancy Protocol) [IETF RFC 2281] or VRRP (Virtual Router Redundancy Protocol) [IETF RFC 3768]. In these solutions, elements of a redundant group of routers use virtual IP and MAC (Medium Access Control) addresses. These addresses are not physically associated to the interfaces of a specific router, but are assigned to a router that is "active", namely responsible for forwarding the local subnet traffic (LAN) for which the router acts as a gateway. For the purpose of the management of redundancy, the routers exchange periodic "hello" messages to verify the router functionality that is elected as "active" or "master"; in case of fault, another router assumes the role of "master" and takes care of forwarding the LAN traffic.

Other possible solutions are represented by the use of layer 3 dynamic routing protocols (e.g., OSPF, RIP, etc.) on the client network end apparatuses, or the use of dynamic reconfiguration mechanisms that forward the traffic towards a backup edge router in case of fault. In that case, the fault detection role is allotted to "Hello" mechanisms, normally implemented by dynamic routing protocols. A recently proposed protocol to realize a quite general "Hello" mechanism is the Bidirectional Forwarding Detection (BFD) protocol: see e.g.: "MPLS-Enabled Applications—Emerging Developments and new Technologies" by I. Minei and J. Lucek—John Wiley & Sons, Ltd., 2005—pp. 69-72.

The document US-A-2004/0076160 discloses a network infrastructure made redundant in order to guarantee protection of the connections between a backbone network such as the Internet and client subnets such as local networks on which some servers (e.g. web servers) are hosted. This prior art solution provides for the duplication of those network devices that are critical for operation; each device that plays the role of a primary network element for a group of subnets also has the task of acting as a backup element for another series of clients. The solution provides for the use of ATM technology as a transmission infrastructure for a peripheral network portion (to which the client subnets interface) towards the access/edge routers of the backbone network. In particular, the ATM network that realizes the client interconnection towards the access routers of the Service Provider, implements a LAN Emulation (LANE) functionality to connect the Ethernet type access subnets. Within the hosting centre, the access routers are redundant and redundancy is managed by a known protocol such as the Hot Standby Router Protocol (HSRP).

To complete this description of the related art, reference may be made to the document by K. Sridhar et al.: "End-To-End Ethernet Connectivity Fault Management in Metro and Access Networks", Alcatel Technology White Paper—Jun. 28, 2005. That document, and the references cited therein, define the following basic concepts within a packet network such as e.g. an Ethernet:

OAM cells (Operational Administration and Maintenance), namely cells that transport the Operation And Maintenance information in defined network points (Maintenance Entity Points) on the basis of presently existing functionalities in the Ethernet world, namely the possibility for an Ethernet to detect the state of the physical link. These cells can be transmitted within a single Virtual Local Area Network (VLAN) with a frequency that can be set by the network user (e.g. few ms), or can be grouped in a VLAN designated as OAM VLAN;

OAM groups defined as:

MEP, Maintenance entity End Point: this initializes and terminates the Ethernet (Eth) OAM functions;

MIP, MEG (Maintenance Entity Group) Intermediate Point: this reports back to the higher layers the OAM state of the lower layer/layers;

TCP, Traffic Conditioning Point: these points perform traffic shaping and policing;

a plurality, typically to the number of eight, of ME (Maintenance Entity) layers.

The OAM cells and the OAM groups so defined generate the following OAM signals that can be used by a protection technique in order to preserve the information transmitted over the network:

ETH_AIS Alarm Indication signal: this is used to inform a subsequent OAM termination entity (MEP), in the transmission chain, that the flow/VLAN under the OAM domain has suffered a fault that has jeopardised the information and that must not be considered valid, ETH_RDI, remote defect indication; this is used when the MEP that has received an ETH_AIS fault report replies, on the same reception side of the received report; this report serves for triggering a possible protection entity arranged upstream, ETH_CC, generated and terminated by a MEP entity; this serves for the end-to-end control of circuit integrity (VLAN or groups of VLANs), ETH_APS auto protection switching; this is generated by the lowest layer OAM entity (the physical layer of the port), and produces the ETH_AIS report and therefore the ETH_RDI report directly at the highest MEP layer set over the network, de facto it controls a switch on all the protected entities.

A packet network, such as e.g. an Ethernet, exhibiting one or more of the features just described, preferably all of them, can be briefly referred to as a packet network equipped "with operation and maintenance procedures for preserving access connectivity over said packet network".

OBJECT AND SUMMARY OF THE INVENTION

The prior art solutions discussed in the foregoing exhibit a number of drawbacks and/or limitations.

In particular, solutions such as those of the HSRP/VRRP type may be exposed to scalability limits; this is due to the number of protocol instances the router processes, if applied to a network of significant dimensions and intended to manage a very high number of clients. Furthermore, the need of a continuous exchange of "Hello" messages between routers can limit the reaction speed to faults and constitutes another critical scalability point.

Those solutions based on dynamic routing or BFD-type protocols require additional functions at the network end apparatuses of the users, with an ensuing complexity and cost increase. Additionally, these solutions are affected by scalability problems, due to the number of protocol instances managed by the edge router towards the client apparatuses. Finally, the message forwarding frequency of the protocol used to detect the fault (e.g. Hello or BFD) limits the reaction time of the protection scheme.

The use of STP or its variants leads to scalability and performance problems (with protection intervention times typically higher than a second).

In the solution described in US-A-2004/0076160, the infrastructure for access aggregation (so-called back-hauling) and binding towards the edge routers of the IP network is redundant at the physical connections layer and is based on the ATM technology, managed through LAN Emulation (LANE). The Applicants have however noted that such option is not applicable in the case where such infrastructure is realised by resorting to the Ethernet technology. More generally, the HSRP protocol used for managing redundancies at the level of the access router to the backbone network requires that messages should be exchanged among the routers that realize the redundancy. Such protocol has been originally devised to provide redundancy in a local communication context such as a LAN environment. In that respect, the Applicants have observed that, in a non LAN specific context, the need for message exchanges represents a intrinsic limitation. This is essentially due to the following reasons:

the aggregation network must also support direct communication among redundant routers on the same physical/logical infrastructure that supports the traffic exchange between the routers and the client networks;

for each logical subnet infrastructure instance (for example a Virtual LAN or VLAN) used for the access of a series of clients to the routers, these clients must manage a protocol instance and the related messaging;

the presence of an active communication protocol between redundant routers, on which fault detection and protection activation depend, poses some limits on the intervention times that can be achieved.

The OAM cell approach mentioned in the foregoing is based on the need of closing the protection domain within the Ethernet OSI layer 2 (L2). The Applicants have observed that such an arrangement is applicable only where a protection domain is defined (i.e. between two ETH_APS entities), that is when protection is terminated homogeneously at the Ethernet layer only. This represents a significant limitation as it makes it impossible to use a single mechanism for the protection of connections and apparatus faults in the network configuration.

More generally, following a failure (i.e. a connection within the transmission system segment becoming unavailable), the physical layer of the local Ethernet interface that links the packet system with the transmission system remains enabled. Consequently, the fault is not detected in the Ethernet domain connected to the transmission system.

All the factors previously listed represent undesirable limitations that lead the Applicants to identify the need for an improved solution able to overcome these limitations. A specific problem underlying the present invention is to define an improved solution that:

does not require any exchange of "Hello" messages between redundant routers or, more generally, does not require a communication protocol between routers in order to manage faults (i.e enabling the "failover");

is completely transparent to the client network end apparatuses and does not require any active intervention on the client side, e.g. for possibly managing reconfiguration procedures following a fault; and provides a fully integrated and fast protection scheme at layers 1, 2 and 3 (L1, L2, and L3) adapted to ensure fast and efficient detection of network faults and a reconfiguration procedure (Protection Switching Ethernet) for fault recovery.

The object of the invention is thus to provide such a new solution.

According to the present invention, that object is achieved by means of a method having the features set forth in the claims that follow. The invention also relates to a corresponding system, a related network as well as a related computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion.

The claims are an integral part of the disclosure of the invention provided herein.

A preferred embodiment of the arrangement described herein is thus a method of providing to users access to a communication network providing communication services, said access being via at least one edge node and a packet network connecting said users to said at least one edge node, the method including the steps of:
  equipping said packet network with operation and maintenance procedures for preserving access connectivity over said packet network;
  associating with said at least one edge node at least one backup edge node to provide access to said communication network providing said services; and
  in the presence of failure of said at least one edge node, connecting said users and said at least one backup edge node by applying said operation and maintenance procedures.

Preferably, the method includes the steps of:
  allotting a common address to said at least one edge node and said at least one backup edge node associated therewith; and
  in the presence of failure of said at least one edge node, connecting said users and said at least one backup edge node by applying said operation and maintenance procedures by using said address common to said at least one edge node and said at least one backup edge node associated therewith.

A particularly preferred embodiment of the arrangement described herein involves the steps of:
  providing in said packet network a primary connection path towards said at least one edge node;
  providing in said packet network a backup connection path towards said at least one backup access node, wherein said primary connection path and said backup connection path are distinct from each other.

The arrangement described herein presents advantageous features that allow to overcome the limitations mentioned in the foregoing.

In the first place, it does not require any exchange of "Hello" messages between redundant routers. More generally, it does not require a communication protocol between routers in order to manage any switching procedure in case of a fault.

Secondly, operation of the arrangement described herein is completely transparent to the client network end apparatuses and does not require any active intervention on the client side to manage any reconfiguration procedure following the fault.

Finally, the arrangement described herein realizes a fully integrated and fast protection scheme at all of the network layers, namely:
  the physical connectivity layer, namely layer 1 or L1,
  the link connectivity layer, namely layer 2 or L2, and
  the service connectivity layer, namely layer 3 or L3.

This result is achieved by using Ethernet layer operation and maintenance (e.g. OAM) procedures for a fast and efficient detection of network faults and for prompting a reconfiguration procedure (Protection Switching Ethernet) for fault recovery. Preferably, these procedures are integrated with appropriate fault detection functions at layer 3 and layer 1 so that either of these layers may invoke the OAM procedures so that the specific fault has an effect at the Ethernet layer. At the same time, following the detection of a fault at the Ethernet layer, a layer 2 Ethernet device that constitutes the single point of failure of the network (H node) effects a switching between the working (W) and a backup or protection (P) branch or path. The IP edge devices (M nodes) implement the reconfiguration procedures at Layer 3 (IP), activated by the switching process.

BRIEF DESCRIPTION OF THE ANNEXED DRAWINGS

Figure 9:
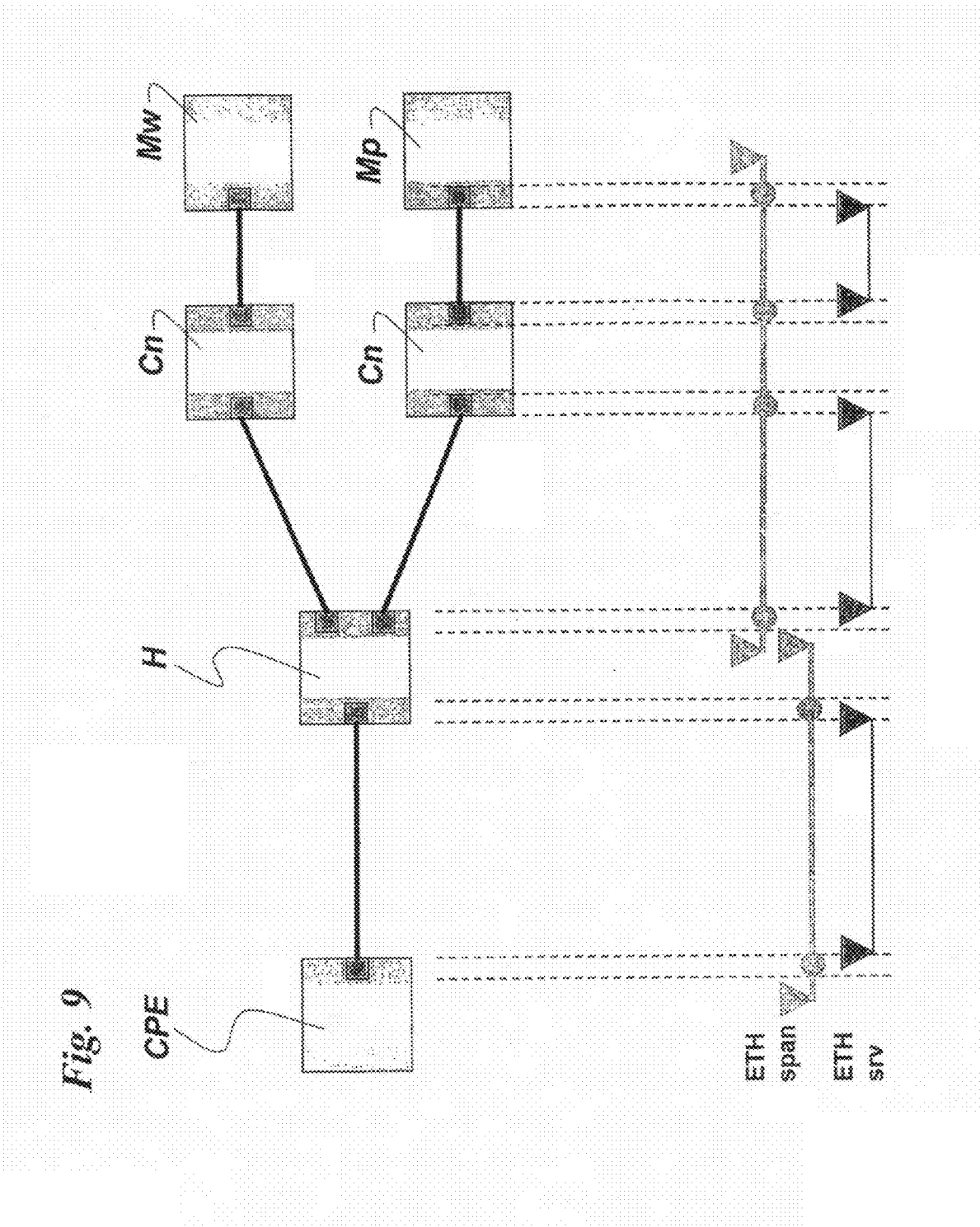
Figure 10:
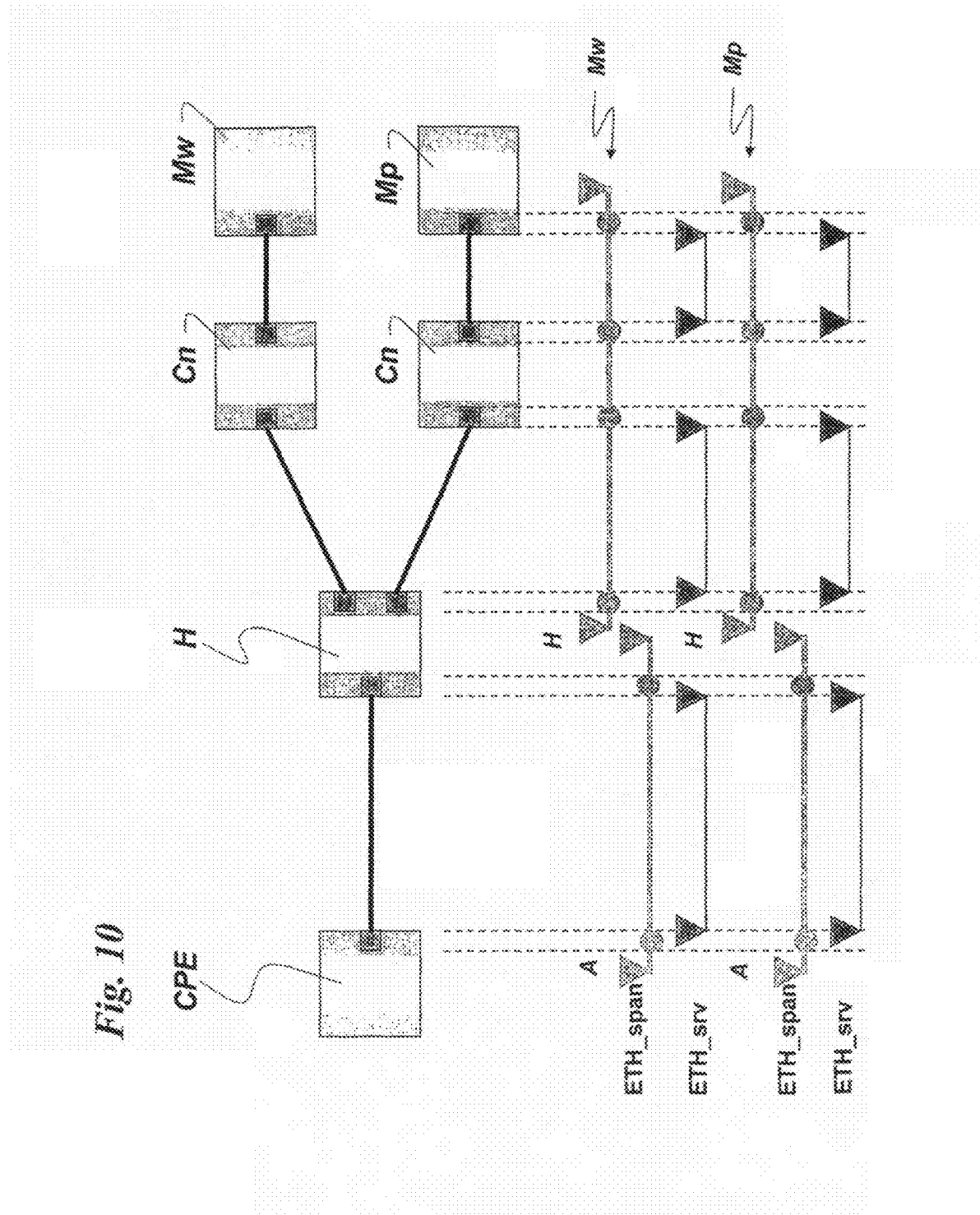
Figure 11:
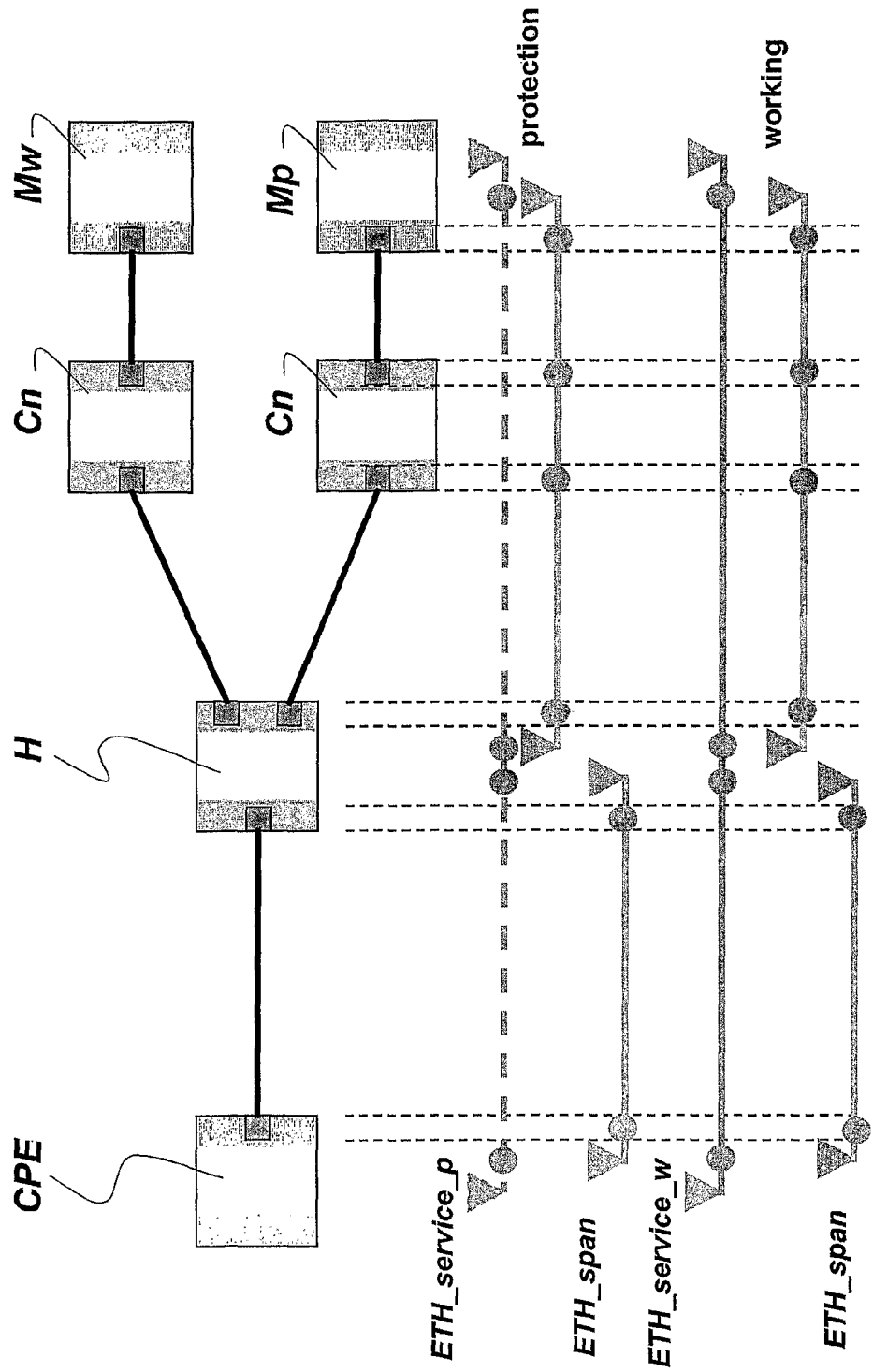

The invention will now be described, by way of example only, with reference to the enclosed figures of drawing, wherein:
  FIGS. 1 and 2 have already been described in the foregoing,
  FIGS. 3 and 4 are schematically representative of a typical context of use of the arrangement described herein,
  FIGS. 5 to 8 are block diagrams detailing the structure of the arrangement described herein,
  FIGS. 9 to 11 are exemplary of the exchange of signals within the framework of the arrangement described herein,
  FIGS. 12 to 28 are exemplary flowcharts of the exchange of signals within the framework of the arrangement described herein, and
  FIG. 29 is a further block diagram representative of a possible extension of the basic layout of the arrangement described herein.

DETAILED DESCRIPTION OF PREFERRED EMBODIMENTS OF THE INVENTION

Figure 4:
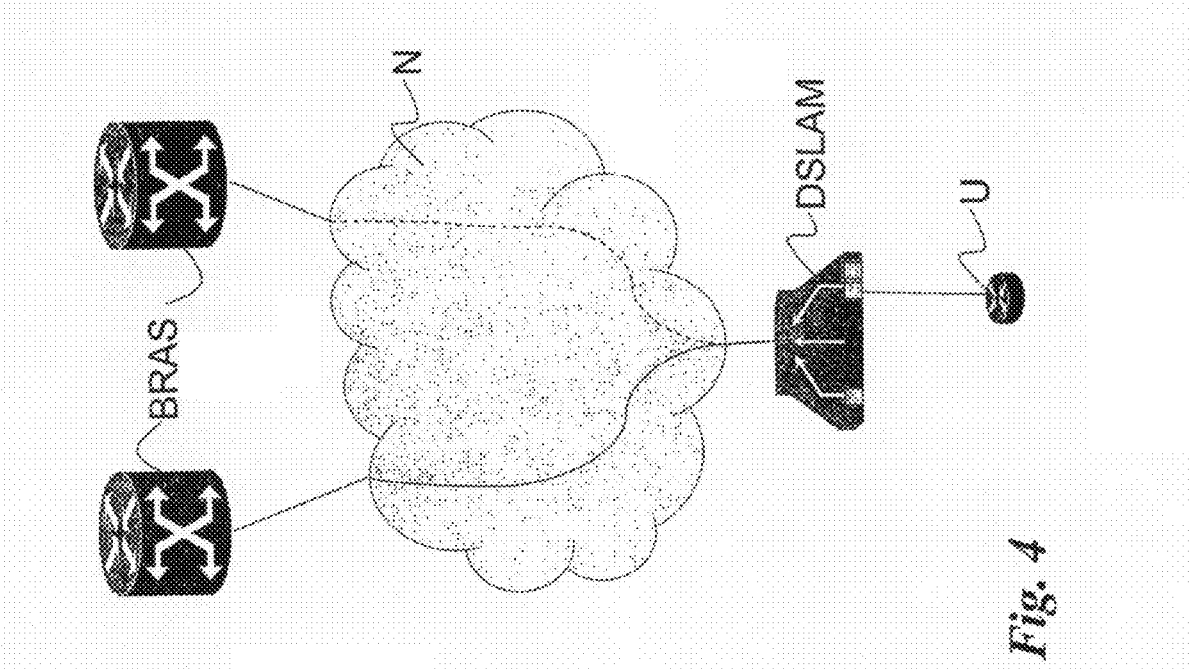
Figure 3:
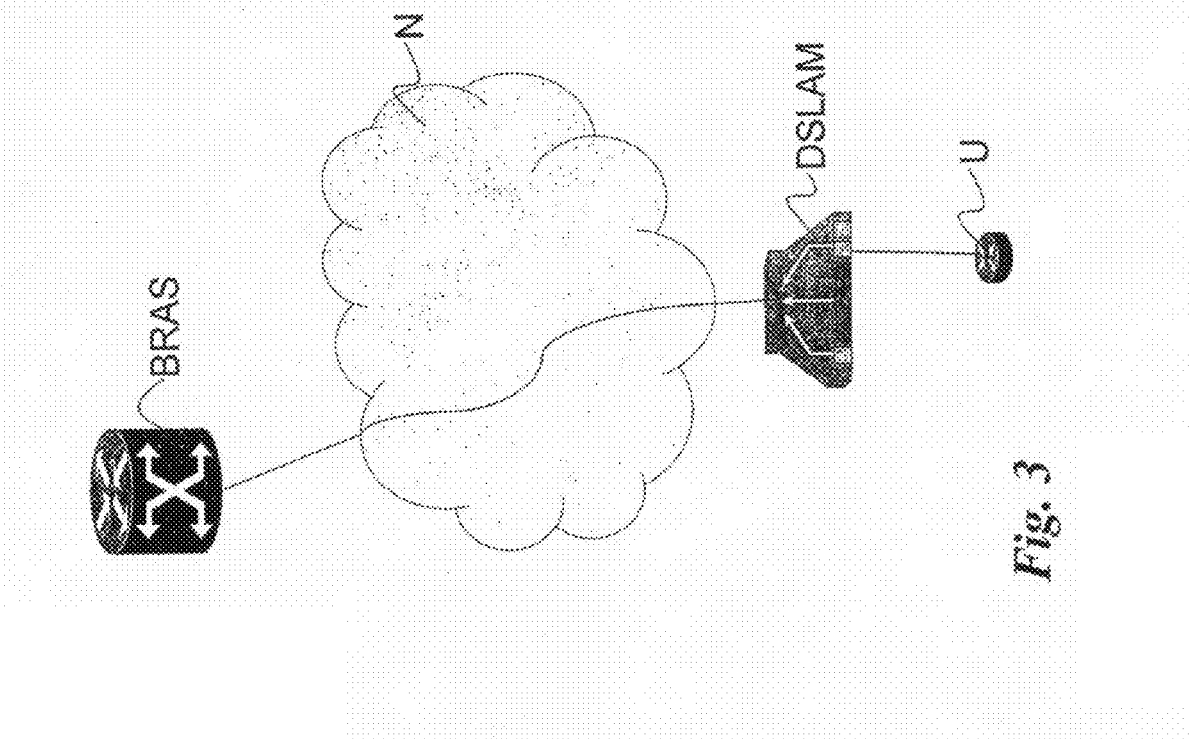

As schematically illustrated in FIGS. 3 and 4 by way of direct reference to FIGS. 1 and 2, the typical scenario of use of the arrangement described herein involves a client end apparatus CPE that realizes Layer 3 functions and can be connected through a Ethernet aggregation network N to at least two distinct edge routers (e.g. BRAS).

Such nodes can be placed within the same POP (Point of Presence) housing or arranged at distinct geographical POP housings in order to allow the use of redundancy also in the case of generalized fault events (disaster recovery) affecting one of the two above mentioned POP. In the following, this type of configuration will be referred to essentially as a dual-homing configuration.

The edge routers (BRAS) are configured in a redundant manner in that, at least for a certain number of clients, a primary or active node has associated thereto a secondary or backup node. As indicated, the clients or users U are connected to such nodes by the network N in the form of a aggregation network such as an Ethernet aggregation network. The N network realizes the connection at Ethernet Layer 2 towards the edge routers, for example through VLAN (Virtual LAN) [IEEE 802.1q] type connections.

Figure 5:
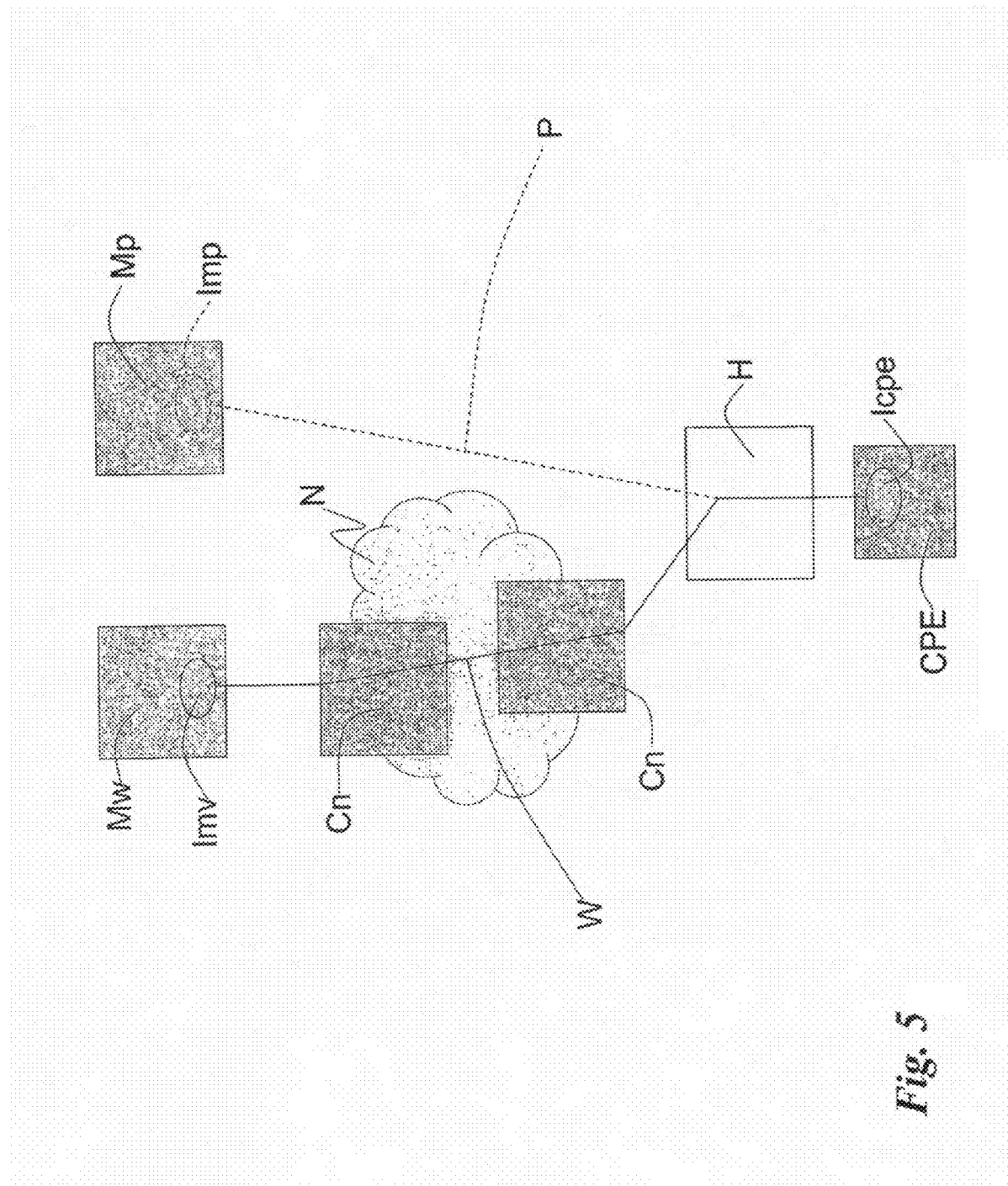

Specifically, by referring to FIGS. 3 to 5, the arrangement described herein provides users U with a logic connection to a (primary) edge router. In the case of failure, the connection is replaced by an alternative, protection connection to a secondary backup edge router, this intervention being essentially "transparent" or "unnoticed" for the user(s) U involved.

As better shown in FIG. 5, the resulting connections are thus comprised of an active (working) segment W towards the primary edge router node (hereinafter designated Mw) and at least one protection segment P towards at least a backup secondary edge router node (hereinafter designated Mp).

Both connections W and P originate from the same Ethernet aggregation network switch (H). The switch H has the task of triggering the protection procedure by activating, in case of fault, the segment P that, up to that moment, has been maintained in protection. The fault detection mechanisms also integrate procedures for indicating possible faults (occurring at Layer 3) due to the malfunctioning of the Mw/Mp nodes and thus permits the Ethernet failover procedure to be triggered in case of even partial unavailability of the edge router node Mw.

The protection segment being enabled allows to address the traffic towards the Mp node and causes activation of the corresponding interface. In these conditions the Mp node automatically assumes the task of forwarding the traffic from the new active interface. The fact that the edge node Mw and the backup edge node Mp associated therewith have a common address (namely, the IP and MAC addresses being shared by the corresponding interfaces, that is interfaces belonging to the same connection, on both the Mw and Mp nodes) makes such reconfiguration operation transparent from a Layer 3 point of view.

The arrangement described herein provides a protection mechanism that is applicable to a generic network configuration as shown in FIG. 5: there, an H apparatus with Ethernet layer 2 functionality that constitutes a single point of failure is connected through two distinct connections to two apparatuses (Mw and Mp) with Ethernet layer 2 functionality and IP layer 3 functionality. The connections can be realized also through one or more apparatuses with Ethernet layer 2 functionality indicated as Cn.

The two connections designated W and P in FIG. 5 can be termed "distinct" insofar as they do not rely on any common physical resources within the network N, so that their only common point is represented by the node H apparatus.

The arrangement described herein allows to manage and retrieve with the same procedure a wide range of fault typologies that prevent correct traffic flow between the node Mw and the user terminal, indicated as CPE. These faults may include, e.g.:
  Mw apparatus faults (including HW faults on interfaces/boards, SW problems, apparatus crashes and loss of power supply);
  one-way and two-way interruptions of one or more connection paths between the Mw apparatus and the node H;
  Cn apparatus faults (including HW faults on interfaces/boards, SW problems, apparatus crashes and loss of power supply);
  board/interface faults in the node H apparatus that have no impact on the connection between the Mp apparatus and the node H.

Under normal network conditions, the Mw apparatus has a logical or physical interface, designated Imw, that is used for forwarding the user traffic to/from the logical or physical interface Icpe, configured on a generic user apparatus. Under normal working conditions, the Mp apparatus will have a virtual interface Imp arranged as a "hot" redundancy of the Imw interface. No information is exchanged between the Mw apparatus and the Mp apparatus to decide the active or standby state of the Imw and Imp interfaces.

The Imw interface (Imp) is in a working state if the Mw (Mp) node apparatus receives from the H apparatus through the Eth OAM protocol an indication to the effect that the logical connection between Mw (Mp) and H is used for forwarding the traffic originating/intended to the Icpe interface.

The Imw (Imp) interface is in a standby state if one of the three following conditions occurs:
  the Mw (Mp) apparatus receives from the H apparatus through the Ethernet OAM protocol an indication to the effect that the connection between Mw (Mp) and H is not used for traffic forwarding,
  the Mw (Mp) apparatus establishes through the use of the Ethernet OAM protocol that the H apparatus is not reachable,
  the Mw (Mp) apparatus recognizes an internal malfunction of its own that prevents correct forwarding of the traffic from/to the Imw (Imp) interface.

The Cn apparatuses are responsible for:
  sending a fault report through the Ethernet OAM protocol to the Mw (Mp) apparatus in case they receive a fault report from the node H or they verify that the node H is not reachable,
  sending a fault report through the Ethernet OAM protocol to the Mw (Mp) apparatus in case they receive a fault report from the Mw (Mp) apparatus or they verify that the Mw (Mp) apparatus is not reachable,
  sending a fault report through the Ethernet OAM protocol to the Mw (Mp) apparatus and to the node H in case they establish that an internal fault compromises correct traffic forwarding on the connection between the node H and the Mw (Mp) apparatus.

The H node apparatus is responsible for:
  forwarding, under normal working conditions, the traffic originating from the Icpe interface over the connection towards Mw,
  maintaining, under normal working conditions, the Imw interface in a working mode and the Imp interface in a standby mode by sending out Eth OAM protocol messages,
  monitoring the connection state towards the Mw and Mp apparatuses,
  controlling by an Eth OAM protocol message the state change or switchover from working/standby at the Imw interface and the standby/working switchover at the Imp interface in case it recognizes a fault situation on the connection towards the Mw apparatus and a correct connection functionality towards the Mp apparatus,
  managing, according to pre-configured policies, the return to a normal working condition of the connection towards the Mw apparatus in case the connection towards the Mp apparatus is active and the connection towards the Mw apparatus is reset.

The described mechanism is realized through the insertion of HW/SW units in conventional Ethernet layer 2 and IP layer 3 apparatuses.

Figure 6:
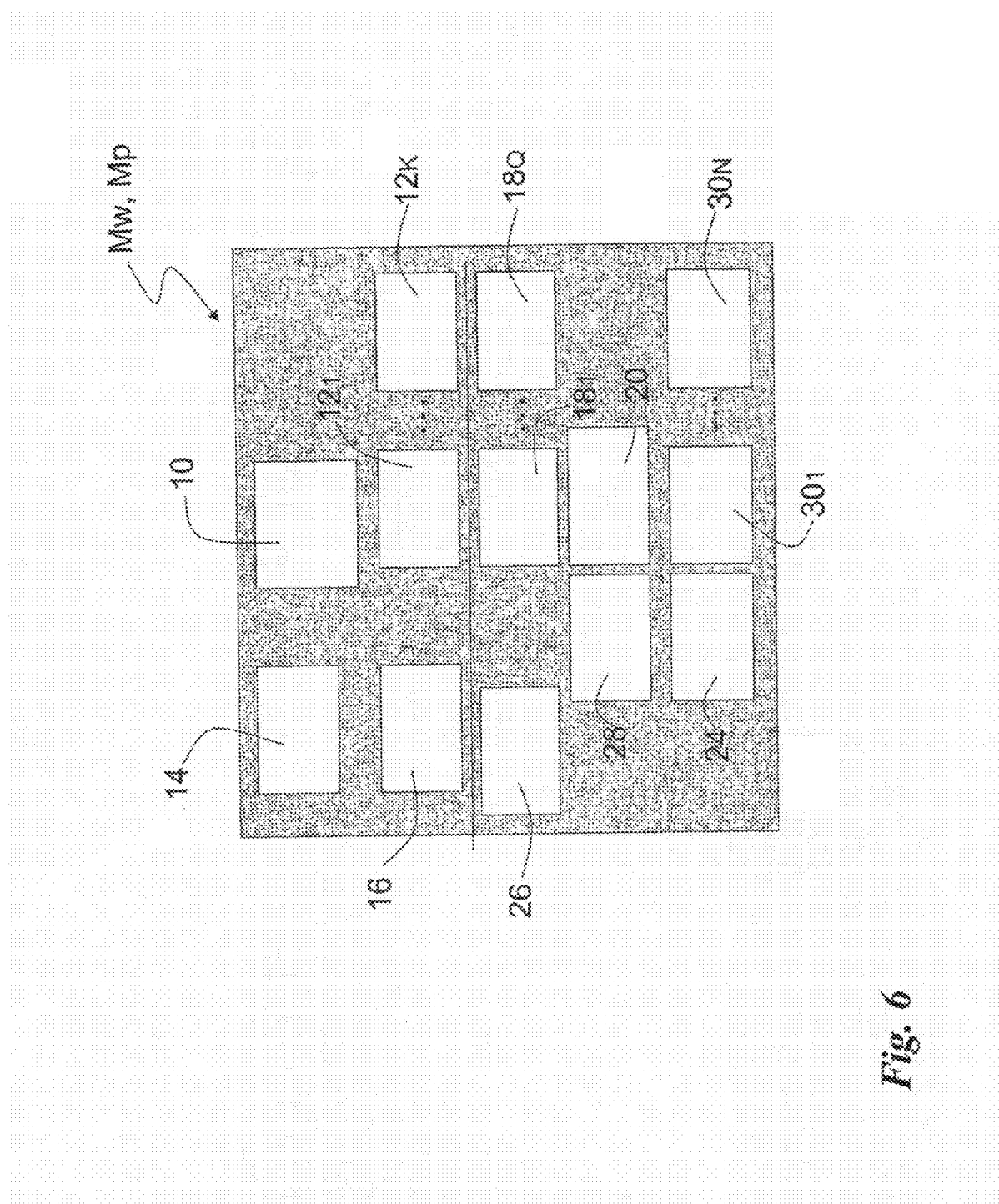
Figure 7:
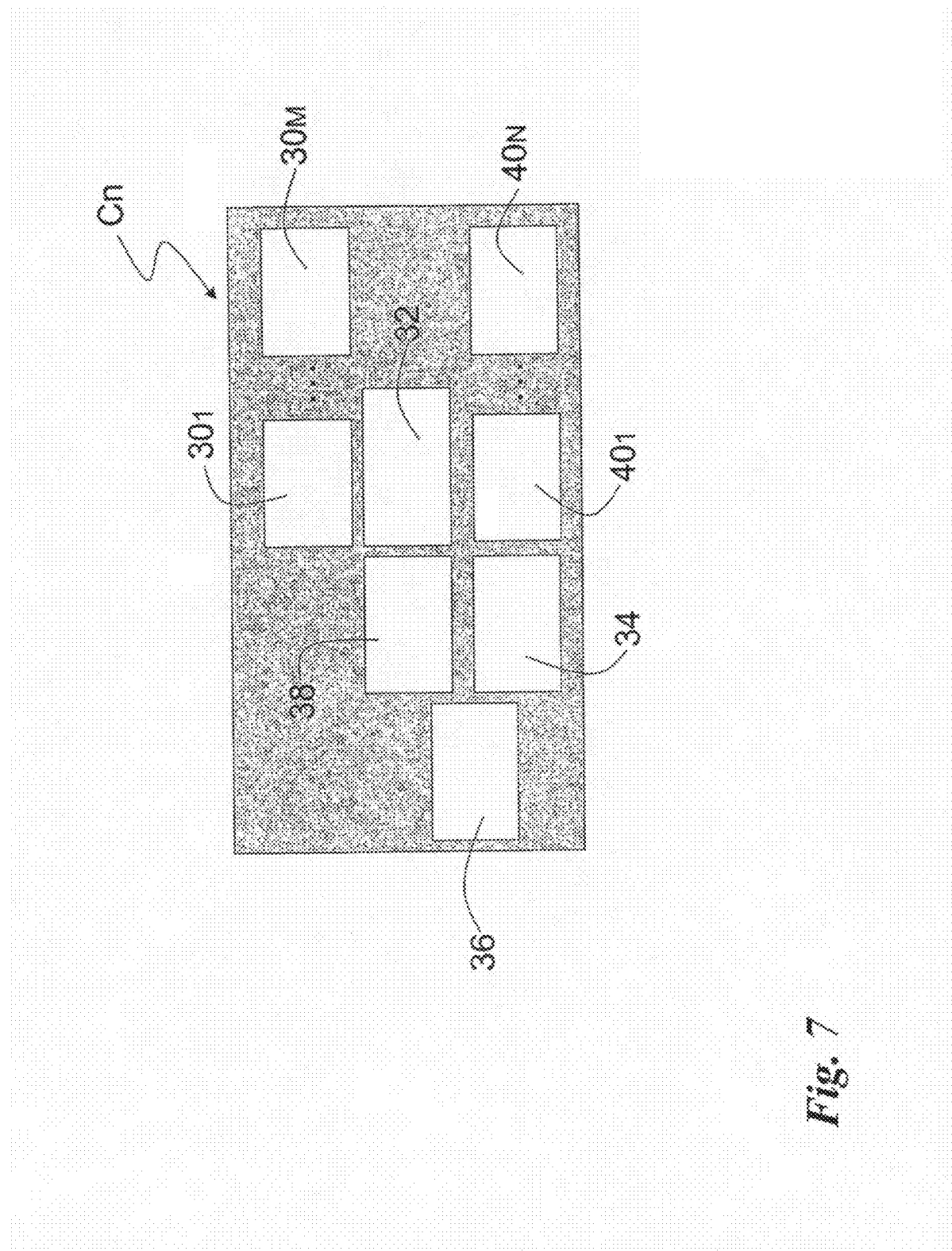
Figure 8:
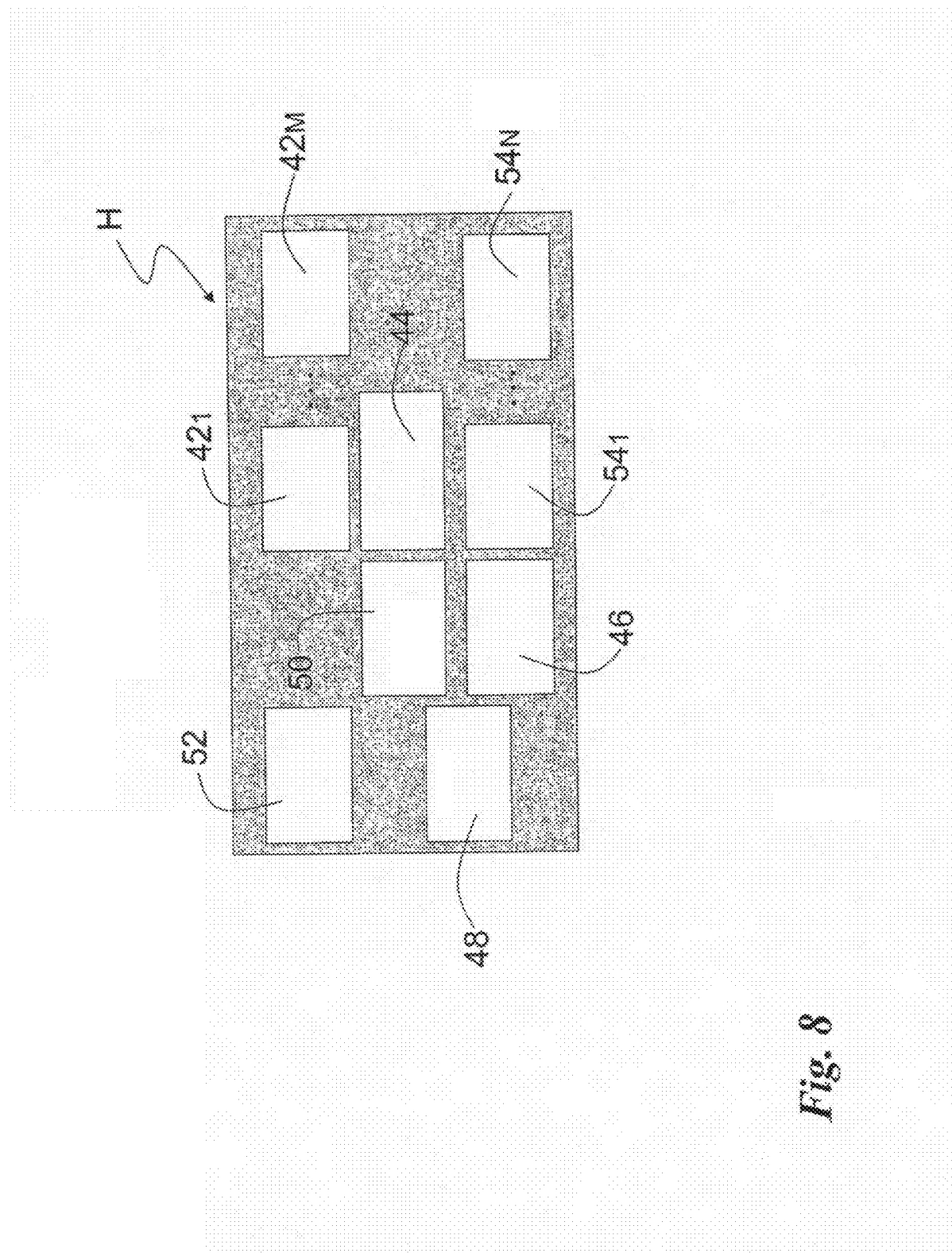

FIGS. 6, 7 and 8 show the block diagrams of the Mw/Mp (FIG. 6), Cn (FIG. 7) and H (FIG. 8) apparatuses.

The Mw and Mp apparatuses include the functional block diagrams described in the following.

A Standard L3 Function module 10 includes all the layer 3 functionalities that are typical of a router or BRAS and are not directly involved in the protection mechanism.

A Logical L3 Interface 121, . . . , 12*k* is a layer 3 logical interface through which the layer 3 traffic (for example IP) flows towards one or more layer 3 network peers; it is based on a Logical L2 port to transfer traffic towards the peer.

A L3 Status Monitoring module 14 is a HW/SW module aimed at verifying the correct operation of the HW modules and of the SW processes that realize the layer 3 functionalities of the Mw/Mp node; it includes a set of diagnostic tests that are performed in an asynchronous manner, in view of anomalies of the single elements controlled, possibly interacting with diagnostic modules appropriately inserted within the HW intended to realize the Standard L3 Function 10; it maintains in a table the state of the possible faults.

Figure 12:
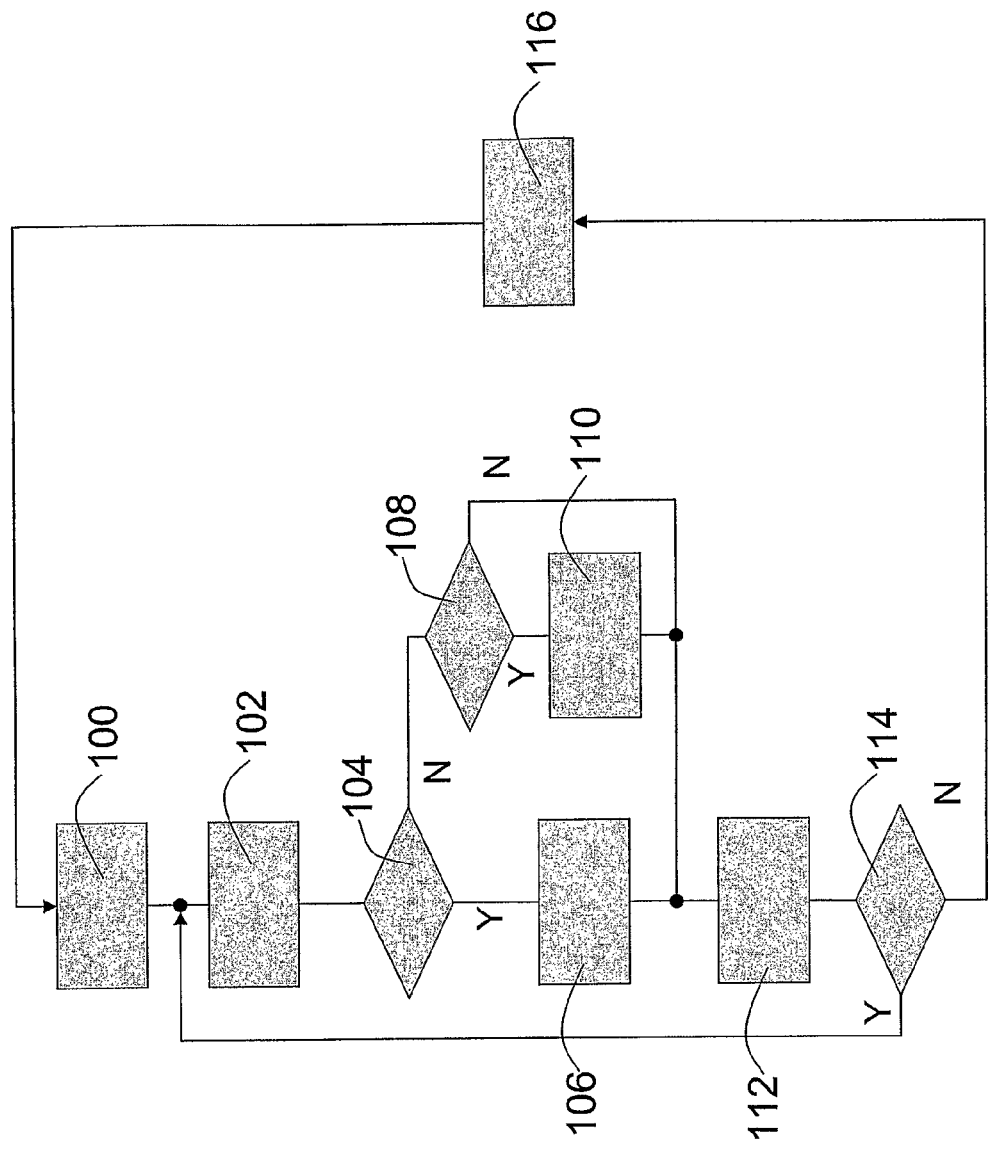
Figure 13:
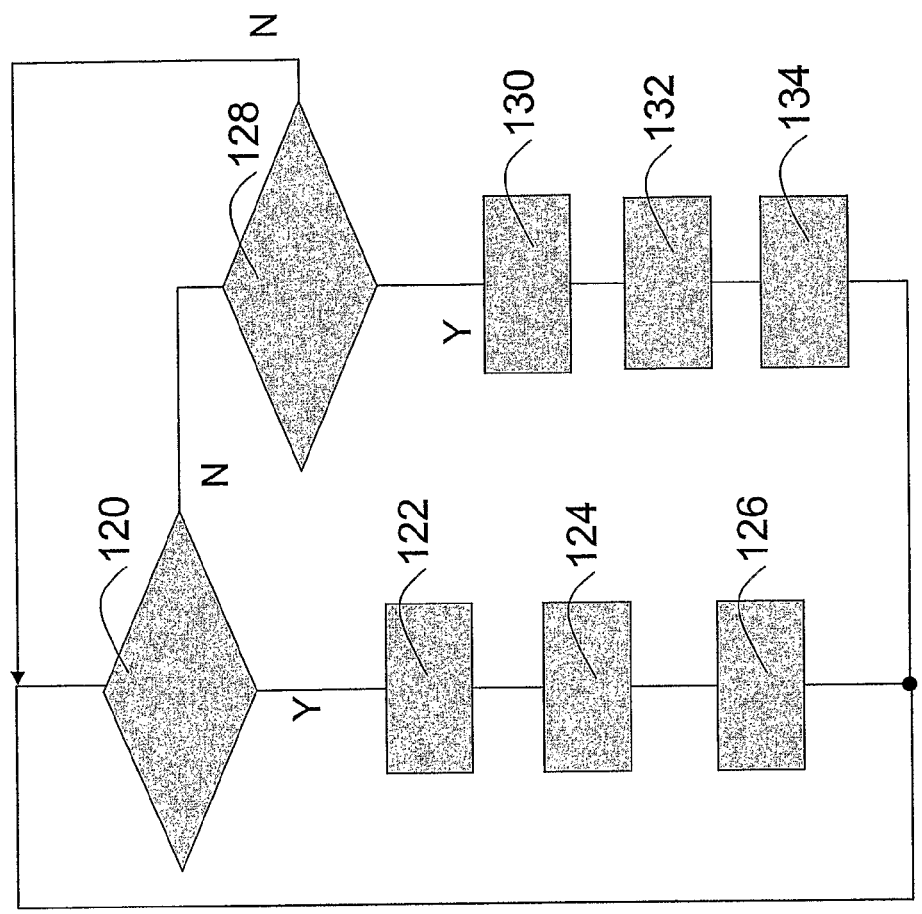

The operational scheme of the module 14 is described in FIG. 12.

Specifically in view of a received asynchronous report (step 100) from the Standard L3 Function module 10, the module 14 sequentially performs (step 102 to 114) a set of expected diagnostic tests and:

if a given test (step 102) fails (positive outcome of the step 104), in a step 106 the module 14 reports the fault to a L3 Protection Unit 16 (to be described later) and sets the flag corresponding to the fault in the table that maintains the fault states;

if the test (step 102) is successful (negative outcome of the step 104) and in the fault table the flag relative to that fault is set (which is checked in a step 108), in a step 110 the module 14 resets the flag and reports to the L3 Protection Unit 16 the fact that the fault has been repaired (i.e. cleared/dispensed with).

In FIG. 12, the blocks 112 and 114 are representative of the step-by-step increase of the test index and of a check that the tests are completed. The block 116 is representative of a waiting step.

The L3 Protection Unit 16 is the module in charge of managing the protection mechanisms at Layer 3 through interactions with a M Eth (Ethernet) Protection Unit 28 considering the functioning state of Layer 3 reported by the L3 Status Monitoring module 14. The operational scheme of the unit 16 is described in FIG. 13.

In particular, in the presence of:

a fault (revealed in a step 120) that jeopardises completely or partly forwarding of the layer 3 traffic intended for the users normally homed with the node, the module 16 detects (in two steps 122 and 124) the Logical L3 Interface/s (Imw/Imp) 121, . . . , 12k on which correct traffic forwarding is not possible and in a step 126 supplies to the M Eth Protection Unit 28 the list of the corresponding Logical L2 ports;

a fault having been repaired (which is revealed in a step 128), the module 16 detects (in two steps 130 and 132) the Logical L3 Interface/s 121, . . . , 12k on which it is possible to re-establish the correct traffic forwarding and in a step 134 supplies to the M Eth Protection Unit 28 the list of the corresponding Logical L2 ports.

A Logical L2 port 181, . . . , 18Q is a layer 2 logical interface through which layer 2 (Ethernet) traffic flows towards one or more layer 2 network peers; it provides within the Mw/Mp node the transport services to one or more Logical L3 Interfaces 121, . . . , 12k. In order to transfer the traffic, this functional block uses in turn the Ethernet packet switching services supplied by a M Standard L2 function module 20 that provides the Ethernet layer 2 standard functionalities and a Physical Layer Port module 310, . . . , 30N (to be described later).

A M Eth OAM Function module 24 is the module in charge of managing the Ethernet (Eth) OAM protocol via the insertion of alarm indications through OAM cells after receiving indications by the M Eth Protection Unit 28, while also reporting to that module the alarm indications and the working/protection state control changes as received by remote Ethernet OAM entities. For each M Logical L2 port 181, . . . , 18Q it manages a timer t(L2) that counts the reception time of the last ETH_AIS/ETH_RDI cell, a timer w(L2) that counts window duration in which the ETH_AIS/ETH_RDI cells are received, a counter n(L2) that counts the ETH_AIS/ETH_RDI cell number received within the time window w(L2), a flag designated Flag(L2) that, if set, indicates that an alarm report has been sent to the M Eth Protection Unit 28.

Figure 14:
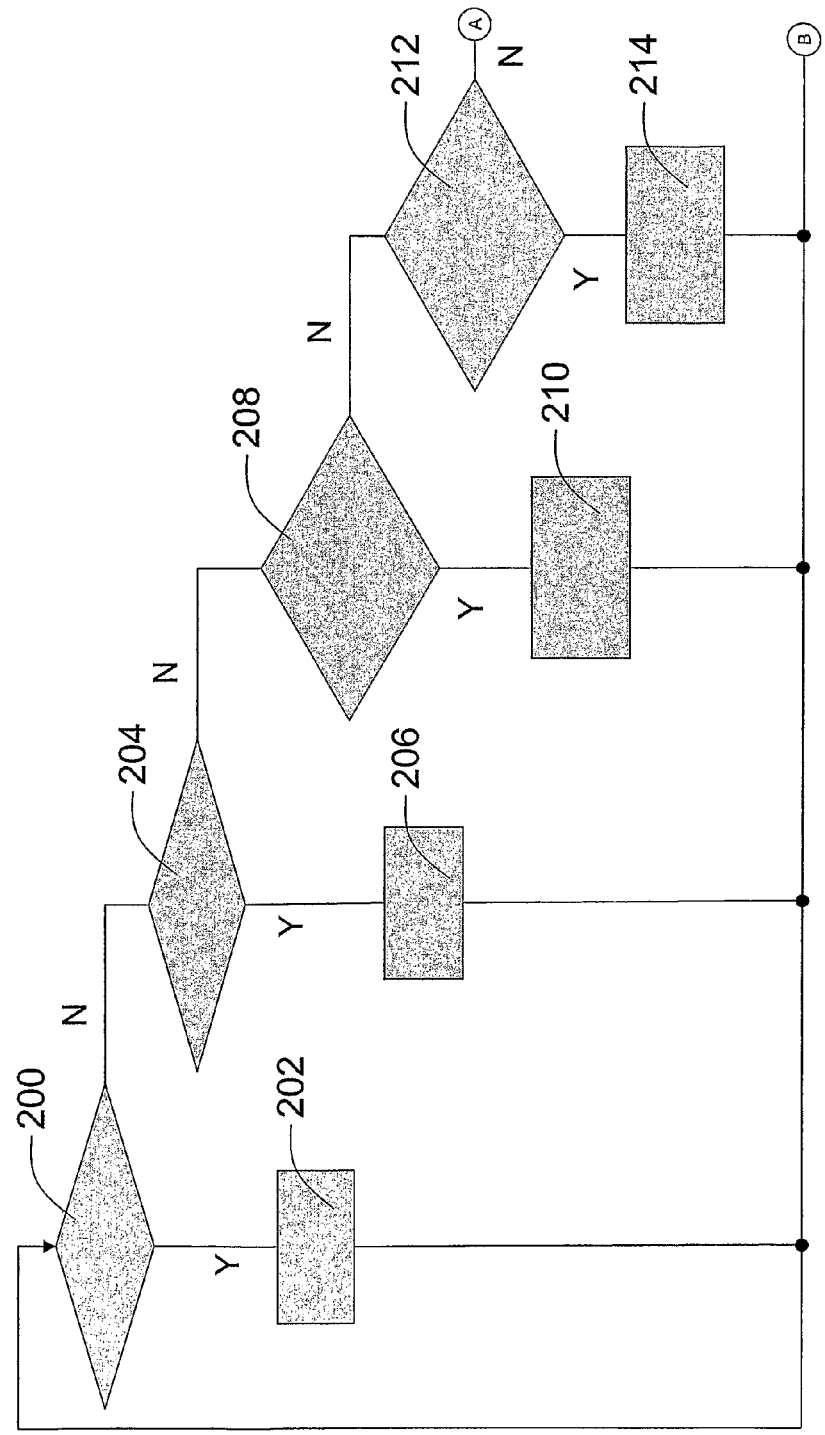
Figure 15:
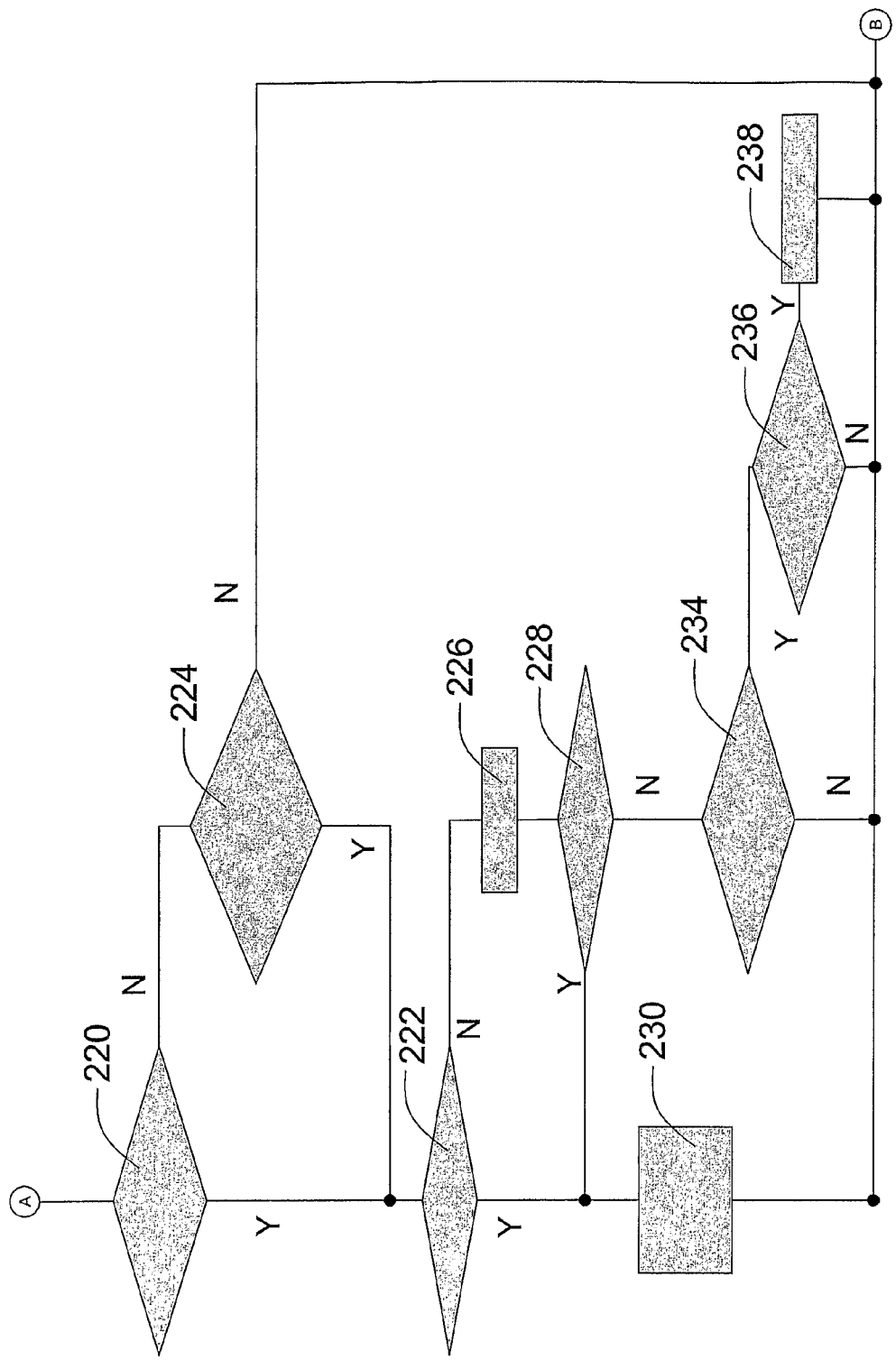

The operational scheme of the module 24 is described in FIGS. 14 and 15.

Specifically:

upon reception (step 200) of an AIS signal report from the M Eth Protection Unit 28 related to a Logical L2 port 181, . . . 18Q, the module 24 starts (in a step 202) sending OAM ETH_AIS cells on the Logical L2 port involved;

upon reception (step 204) of an AIS clear signal report from the M Eth Protection Unit 28 related to a Logical L2 port 181, . . . , 18Q, the module 24 discontinues (in a step 206) the sending of OAM ETH_AIS cells on the Logical L2 port involved;

upon reception (step 208) of a state change report from working to protection of a Logical L2 port from a remote apparatus, the module 24 reports (in a step 210) the state change to the M Eth Protection Unit 28;

upon reception (step 212) of a state change report from protection to working of a Logical L2 port from a remote apparatus, the module 24 reports (in a step 214) the state change to the M Eth Protection Unit 28;

upon reception of a ETH_AIS cell (step 220) or an ETH_RDI cell (step 224) on the logical port L2 at time t preceded by a time interval T in which the ETH_AIS/RDI_AIS cells have not been received on that logical port (i.e. t(L2)>=T, which is checked in a step 222), in a step 230 the module 24 resets the timer t(L2), the timer w(L2), and sets Flag(L2)=0 and n(L2)=1;

upon reception of a ETH_AIS/ETH_RDI cell on the logical port L2(steps 220-224) at a time t—not—preceded by a time interval T in which the ETH_AIS/RDI_AIS cells have not been received on that logical port (t(L2)<T, which is checked in the step 222), in a step 226 the module 24 resets the t(L2) timer and increases by one the counter n(L2).

if the timer w(L2)<=Z (which is checked in a step 228), n(L2)>=N and the Flag(L2)=0 (which is checked in two steps 234 and 236), in a step 238 the module 24 sets the Flag(L2)=1 and sends a fault report to the M Eth Protection Unit 28.

If the step 228 yields a positive outcome, indicating that w(L2)>Z, the module 24 evolves to the step 230.

If either of the steps 234 and 236 yields a negative outcome, the process ends (point B).

A M L2 Status Monitoring module 26 is in charge of verifying the correct layer 2 HW/SW functionalities of the apparatus, including the M L2 Standard function 20 and the Physical layer ports 301, . . . , 30N; it includes a set of diagnostic tests that are performed in an asynchronous manner, in view of anomalies of the single checked elements, possibly interacting with diagnostics modules inserted within the HW intended to realize the M Standard L2 Function module 20; it maintains in a table the state of the possible faults.

Figure 16:
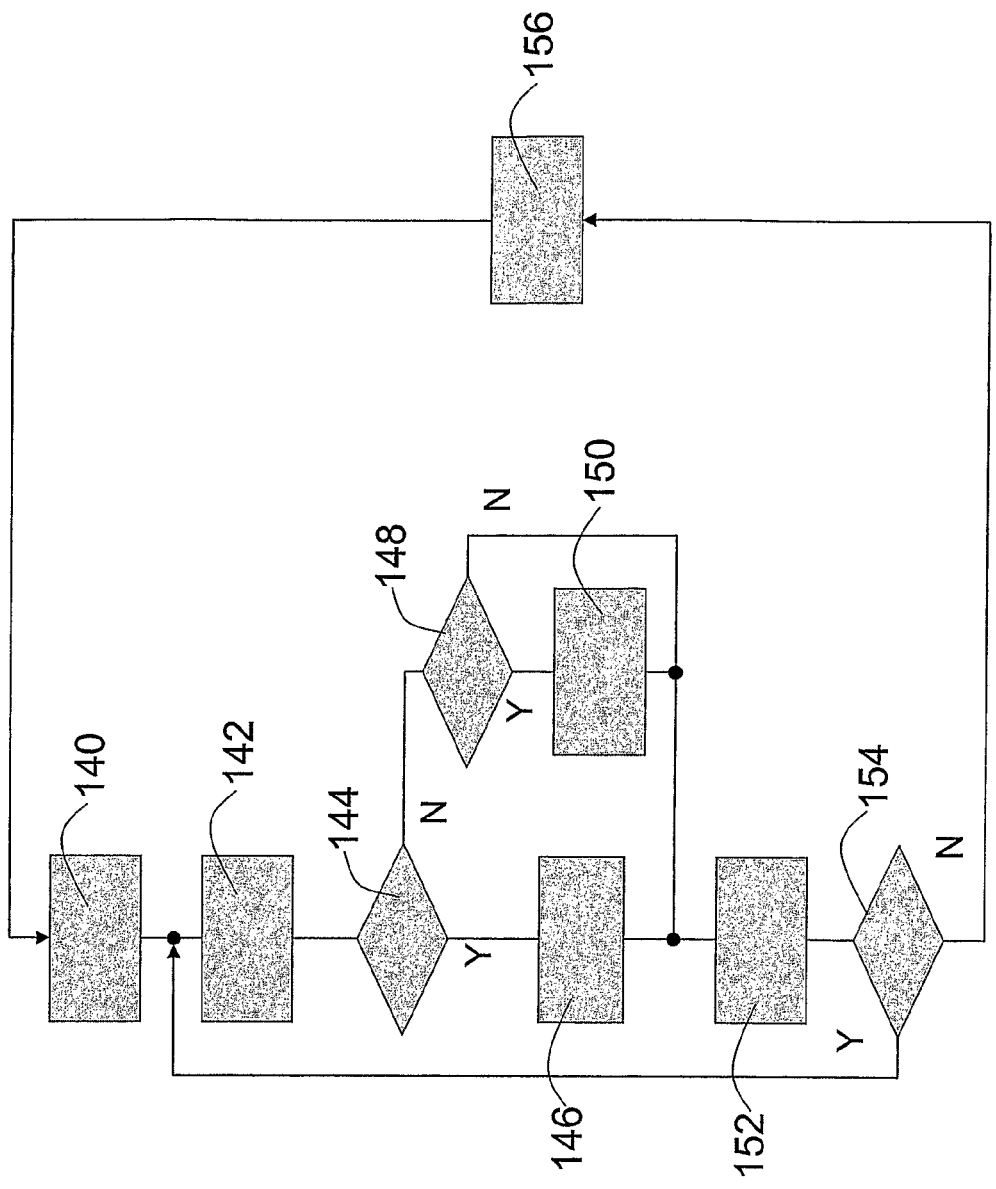

The operational scheme of the module 26 is described in FIG. 16.

Specifically, in view of an asynchronous report received (in a step 140) from the Standard L2 Function 20 the module 26 sequentially performs (steps 142 to 154) the expected diagnostic tests and:

if a given test (step 142) fails (positive outcome of the step 144), in a step 146 the module 26 reports the fault to the M Eth Protection Unit 28 and sets the flag related to the fault in the table that maintains the fault states;

if the test is successful (negative outcome of the step 144) and in the fault table the flag related to the fault in question is set (which is checked in a step 148), in a step 150 the module 26 resets the flag and reports to the M Eth Protection Unit 28 the fact that the fault has been repaired.

As in FIG. 12, in FIG. 16, the blocks 152 and 154 are representative of the step-by-step increase of the test index and of the check that the tests are completed. The block 156 is representative of a waiting step.

The M Eth protection unit 28 is the module in charge of activating the fault report mechanisms and of disabling the Logical Ports that can no longer be used for forwarding traffic following a layer 2 or layer 3 fault within the Mw/Mp apparatus or a fault report received from a remote node.

Figure 17:
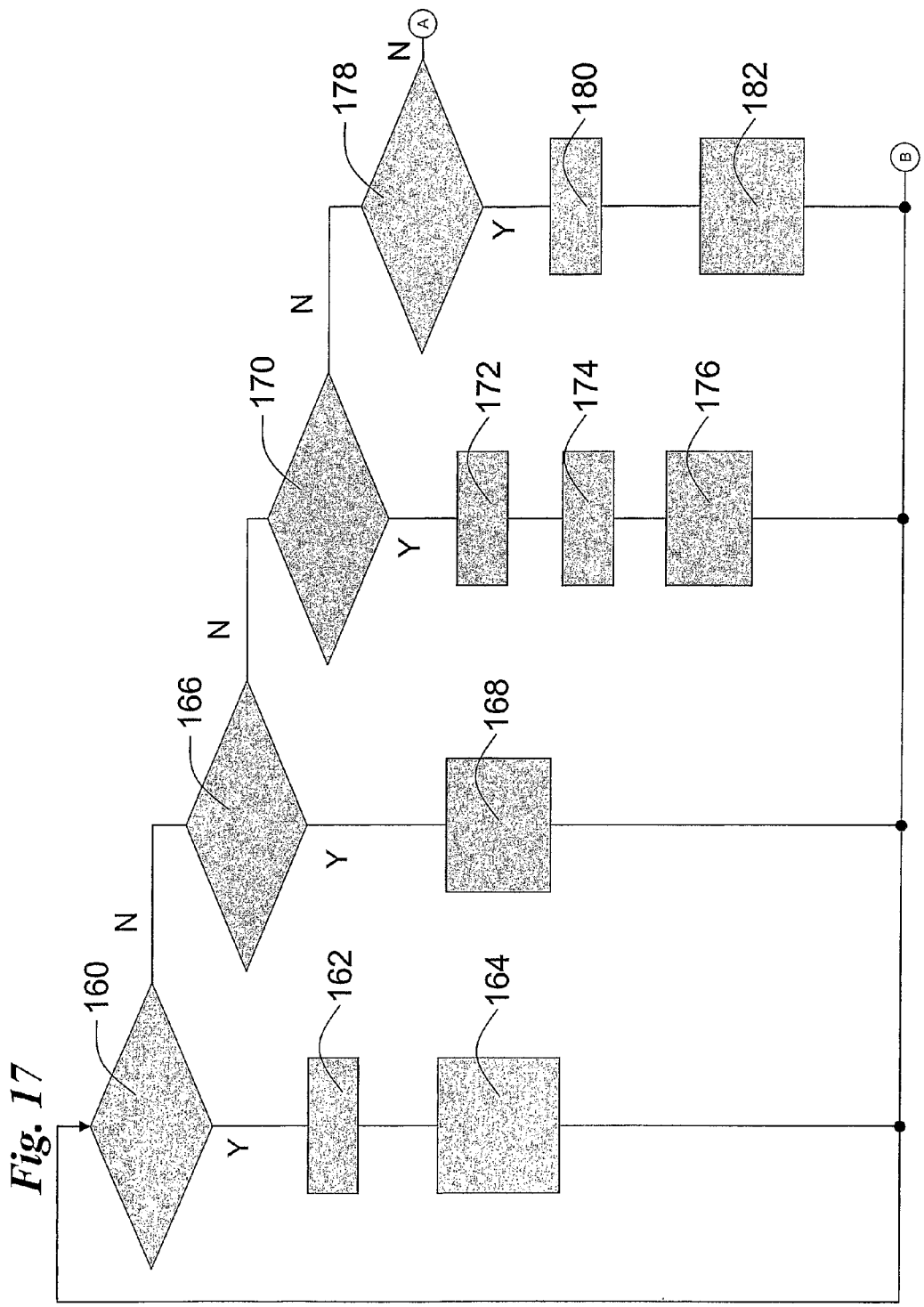
Figure 18:
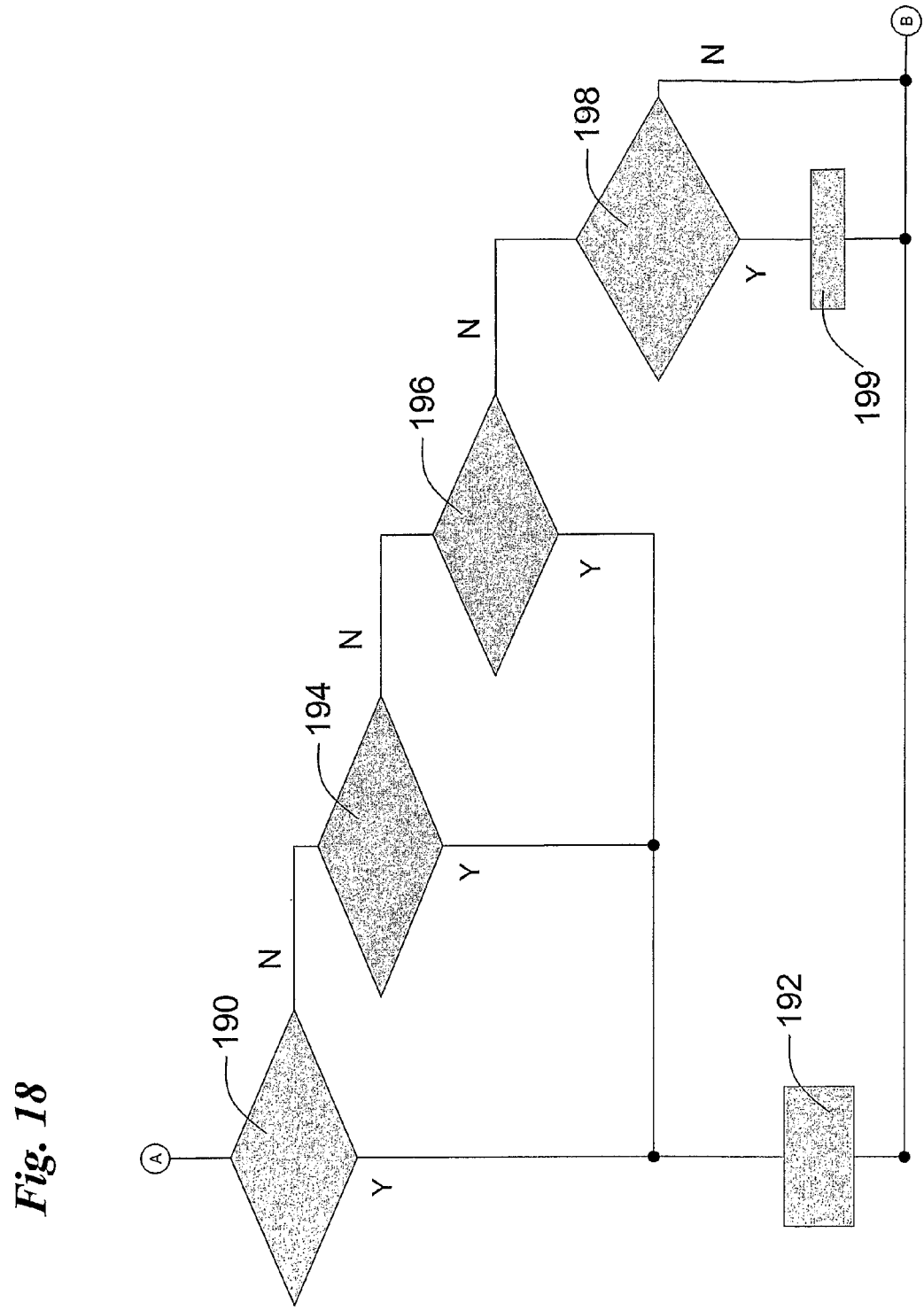

The operational scheme of the unit 28 is illustrated in FIGS. 17 and 18.

In particular, in the presence of:
a fault report (step 160) received from the L3 Protection Unit 16, in a step 162 the unit 28 disables the Logical L2 port(s) corresponding to the Logical L3 Interfaces 121, . . . , 12k affected by the fault and, in a step 164, the unit 28 requests the M Eth OAM function module 24 to send a ETH_ETH_AIS report on the Logical L2 port(s) that inform the remote nodes, downstream of the fault;
a fault repair report (step 166) received from the L3 Protection Unit 16, in step 168 the unit 28 requests the M Eth OAM function module 24 to discontinue sending the ETH_AIS report on the Logical L2 port(s) that inform the remote nodes, downstream of the fault;
a fault report (step 170) received from the M L2 Status monitoring module 26, after evaluating in step 172 the impact on the L2 logical ports, in a step 172 the unit 28 disables the Logical L2 port(s) affected by the fault and in a step 176 requests the M Eth OAM function module 24 to send a ETH_AIS report on the Logical L2 port(s) that inform the remote nodes, downstream of the fault;
a fault repair report (step 178) received from the M L2 Status monitoring module 26, after again evaluating in step 180 the impact in the L2 logical ports, in step 182 the unit 28 requests the M Eth OAM function module 24 to discontinue sending the ETH_AIS report on the Logical L2 port(s) that inform the remote nodes, downstream of the fault;
a ETH_AIS report received (step 190) from the M Eth OAM function module 24, the unit 28 disables in a step 192 the Logical L2 port(s) affected by the fault;
a ETH_RDI report received (step 194) from the M Eth OAM function module 24, in the step 192 the unit 28 disables the Logical L2 port(s) affected by the fault;
reception (step 196) from the M Eth OAM function module 24 of the indication to change the state of a Logical L2 port from working to protection, in the step 192 the unit 28 disables the Logical L2 port concerned;
reception (step 198) from the M Eth OAM function module 24 of the indication to change the state of a Logical L2 port from protection to working, in a step 199 the unit 28 enables the Logical L2 port concerned.

In the block diagram of FIG. 6, the references 301, . . . , 30N designate the physical layer ports included in the nodes Mw and Mp.

As detailed in FIG. 7, each apparatus Cn includes a set of Logical L2 ports 311, . . . , 31M each comprised of a layer 2 logical interface through which the layer 2 (Ethernet) traffic flows towards one or more layer 2 network peers; in order to transfer the traffic this functional block uses in turn the Ethernet packet switching services supplied by a C Standard L2 function module 32 that supplies the standard functionalities of Ethernet layer 2 and by a C Physical Layer Port module 401, . . . , 40N.

The C Standard L2 Function module 32 realizes the Ethernet packet switching between the Logical L2 ports belonging to the same bridging domain as specified in the IEEE 802.1d, 802.1q standards and their extensions.

A C Eth OAM Function module 34 is in charge of managing the OAM Ethernet protocol that has the role of inserting alarm indications through OAM cells following the indications received from a C Eth Protection Unit 38.

Figure 19:
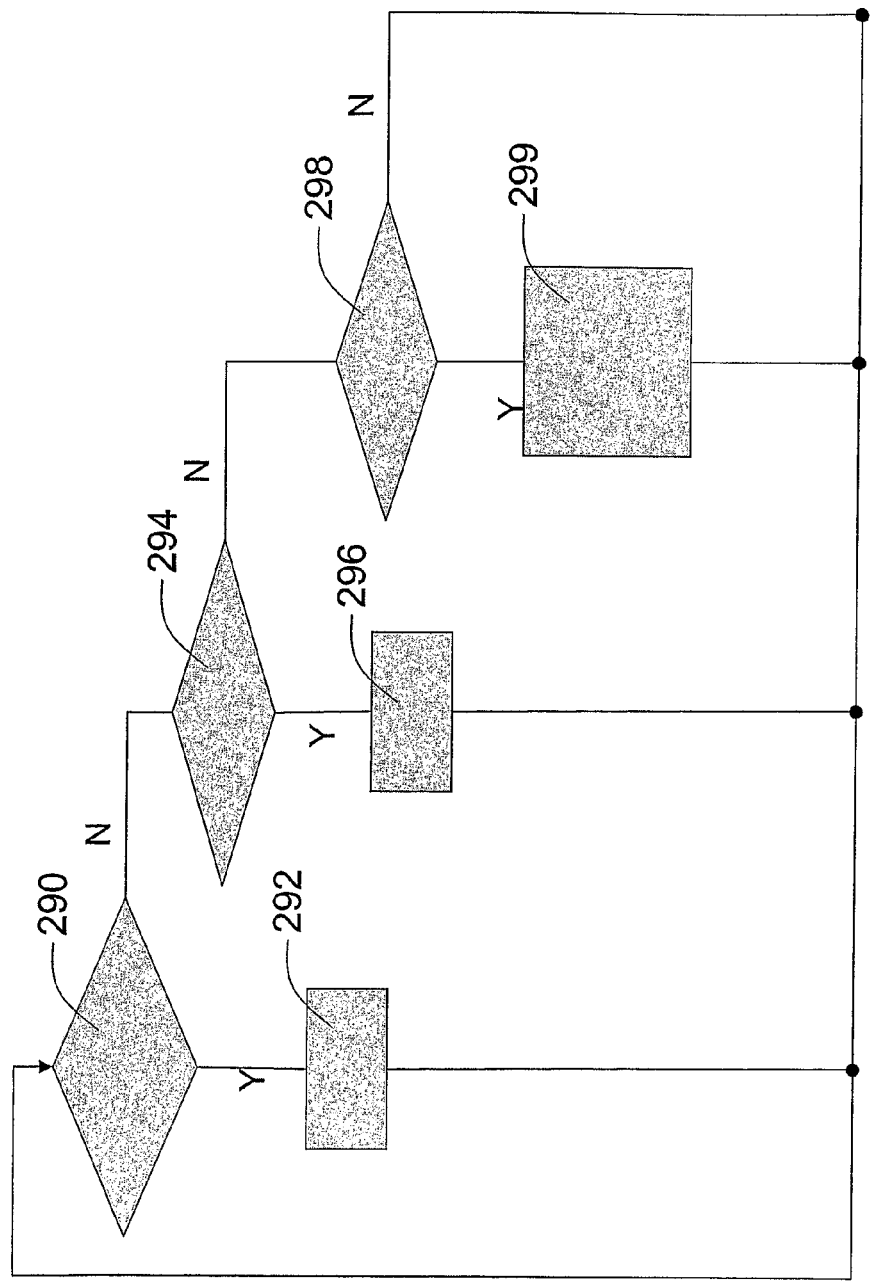

The operational scheme of the module 34 is described in FIG. 19.

Specifically:
upon reception (step 290) of an AIS signal report from the C Eth Protection Unit 38 relative to a Logical L2 port 311, . . . , 31M, in a step 292 the module 34 starts sending the OAM ETH_AIS cells on the Logical L2 port concerned;
upon reception (step 294) of an AIS clear signal report from the C Ethernet Protection Unit 38 relative to a Logical L2 port, in a step 296 the module 34 discontinues sending of OAM ETH_AIS cells on the Logical L2 port;
following the reception (step 298) of an ETH_AIS alarm (in OAM cells format) on the basis of a logical/physical interface (VLAN, port, etc.), relative to an individual logical/physical port, in a step 299 the module 34 replaces the payload signal in the flow identified by means of the corresponding logical/physical port with the standard ETH_AIS signal;
following the reception (still in step 298) of the ETH_RDI alarm (in OAM cells format), relative to an individual logical/physical port, the module 34 simply recreates during transmission an identical alarm report in a direction homogeneous to the direction of reception without effects on the payload of the corresponding flow.

A C L2 Status Monitoring module 36 is in charge of verifying the correct operability of the layer 2 HW/SW functionalities of the apparatus, including the C L2 Standard function module 32 and the Physical layer ports 401, . . . , 40N. The module 36 includes a set of diagnostic tests that are performed in an asynchronous manner, in view of anomalies of the single elements checked, possibly interacting with diagnostic modules provided within the HW of the C L2 Standard Function module 32. The module 36 maintains in a table the state of the M possible faults.

Figure 20:
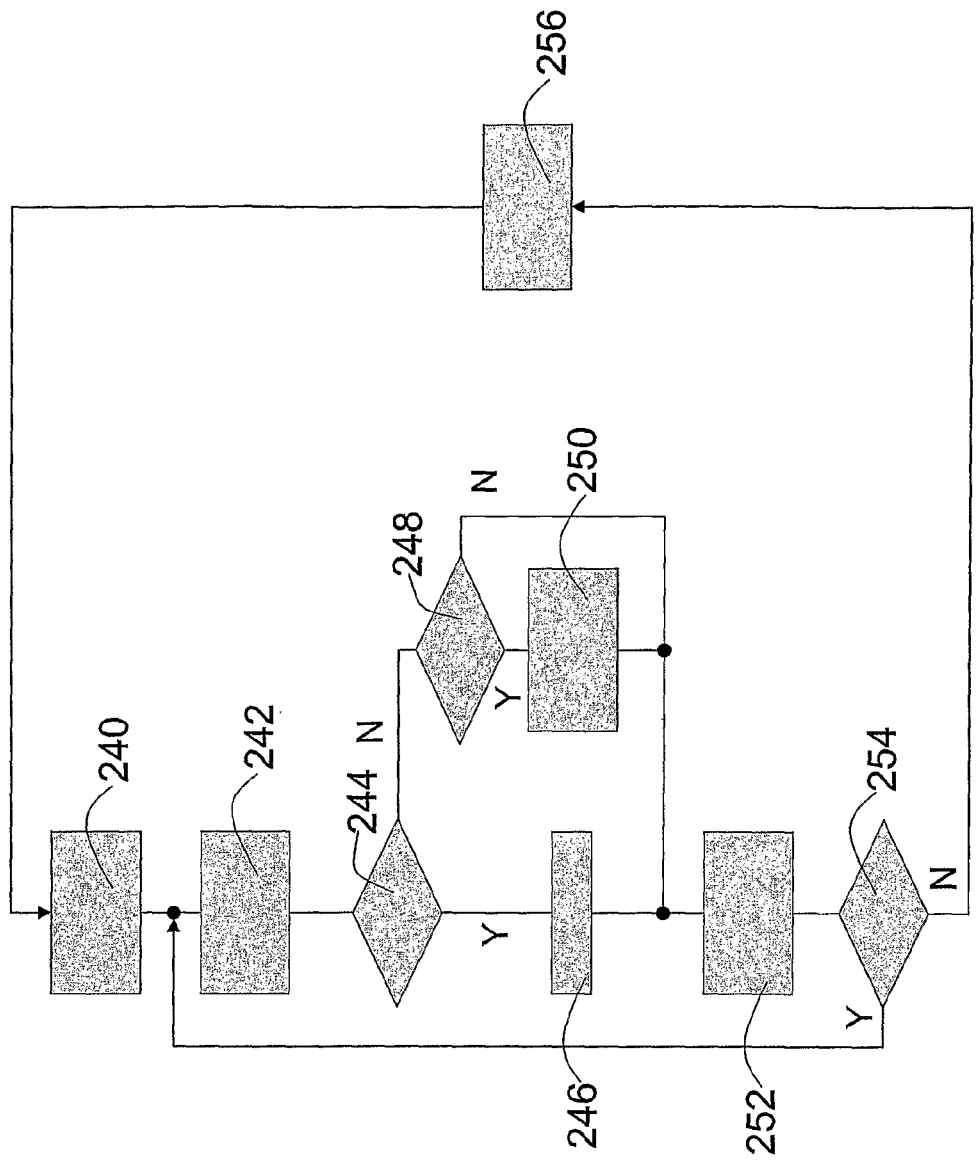

The operating scheme of the module 36 is described in FIG. 20.

Specifically, in view of an asynchronous report received (step 240) from the C Standard L2 Function module 32, the module 36 sequentially performs the diagnostic tests (steps 242 to 254) and:
if a given test (step 242) fails (positive outcome of the step 244), in a step 246 the module 36 reports the fault to the C Eth Protection Unit 38 and sets the flag related to the fault in the table that maintains the fault states;
if the test (step 242) is successful (negative outcome of the step 244) and in the fault table the flag related to the fault in question is set (which is checked in s step 248), in a step 250 the module 36 resets the flag and reports to the C Eth Protection Unit 38 the fact that the fault has been repaired.

As in FIGS. 12 and 16, in FIG. 20, the blocks 252 and 254 are representative of the step-by-step increase of the test index and of the check that the tests are completed. The block 256 is representative of a waiting step.

A C Eth protection unit 38 is in charge of activating the fault report mechanisms following a layer 2 fault within the Cn apparatus.

Figure 21:
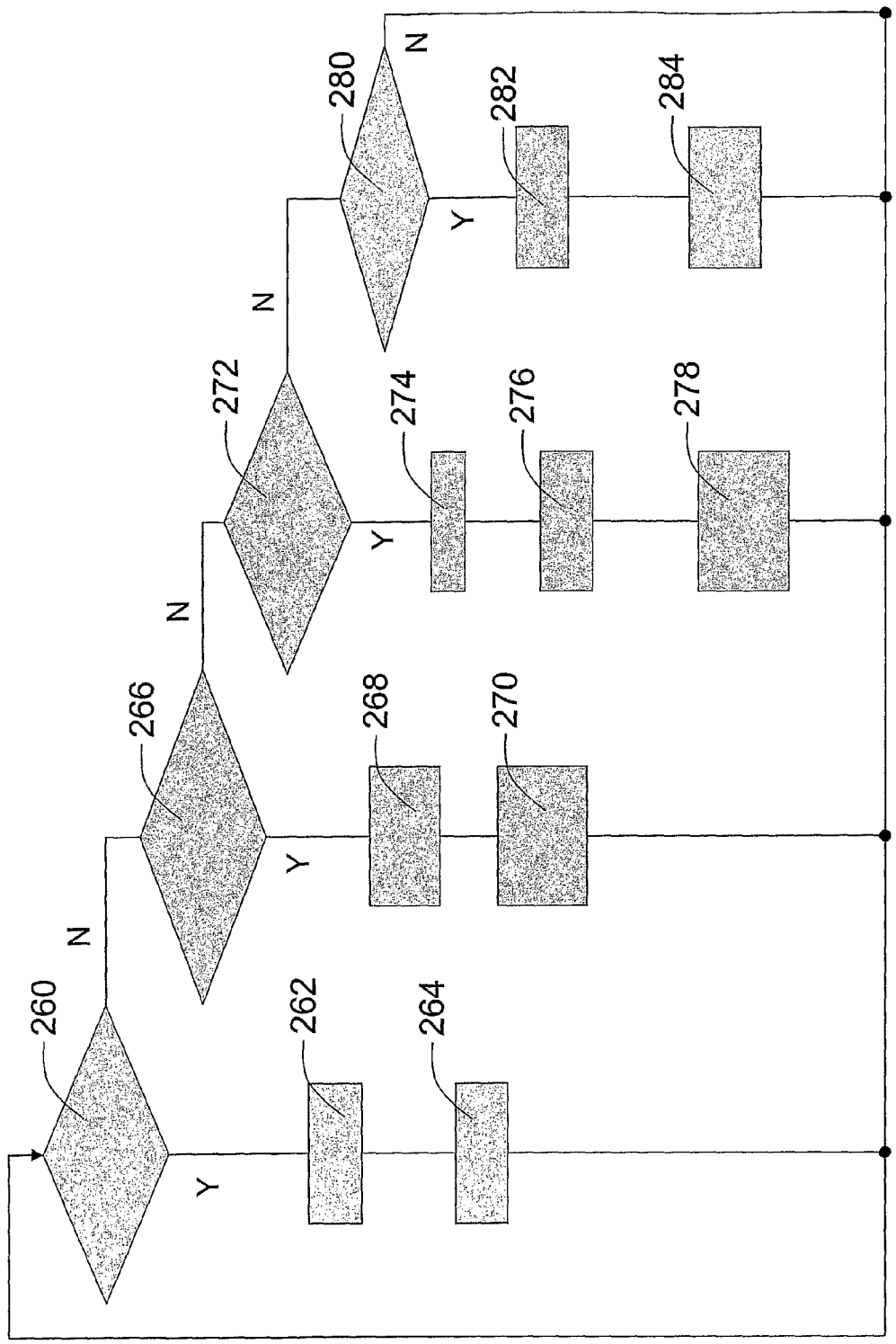

The operational scheme of the unit 38 is described in FIG. 21.

Specifically, in the presence of:

a fault report (step 260) on the C L2 Standard Function 32 received from the C L2 Status Monitoring module, after evaluating in a step 262 the impact on the L2 logical ports, in a step 264 the unit 38 requests the C Eth OAM function module 34 to send a ETH_AIS report that informs the remote nodes, downstream of the fault on the Logical L2 port(s) affected by the fault;

a report (step 266) indicative of a fault having been repaired from the C L2 Status Monitoring module 36, after evaluating in a step 268 the impact on the L2 logical ports, in a step 270 the unit 38 requests the C Eth OAM function to discontinue sending of OAM ETH_AIS cells;

a fault report (step 272) on the Physical Layer Port 401, ..., 40N received from the C L2 Status Monitoring module 36, after evaluating in a step 274 the impact on the L2 logical ports, in a step 276 the unit 38 requests the C Eth OAM function 34 to send upstream of the fault, a report through OAM ETH_RDI cells, on the Logical L2 port(s) connected to the Physical Layer Port affected by the fault and, in a step 278, the unit 38 requests the C Eth OAM function 34 to send a report downstream of the fault, through OAM ETH_AIS cells, on the Logical L2 port(s) belonging to the same bridging domain of the Logical L2 port(s) affected by the fault; these reports inform the remote nodes of the fault condition;

a report (step 280) indicative of a fault having been repaired, after evaluating in a step 282 the impact on the L2 logical ports, in a step 284 the unit 38 requests the C Eth OAM function module 34 to discontinue sending OAM ETH_AIS/ETH_RDI cells.

In the block diagram of FIG. 7, the references 401, ..., 40N designate the physical layer ports included in the nodes Mw and Mp.

The following is a description of the functional modules included in the apparatus H.

A set of Logical L2 ports 421, ..., 42M comprise a layer 2 logical interface through which layer 2(Ethernet) traffic flows towards one or more layer 2 network peers; in order to transfer the traffic this functional block uses in turn the Ethernet packet switching services provided by a H Standard L2 Function module 44 that supplies the standard functionalities of Ethernet layer 2 and by a Physical Layer Port module 541, ..., 54N.

Specifically, the H Standard L2 Function module 44 performs Ethernet packet switching between Logical L2 ports belonging to the same bridging domain according to the criteria specified by the IEEE 802.1d, 802.1q standards and their extensions.

A H Eth OAM Function module 46 is in charge of managing the OAM Ethernet protocol in charge of inserting alarm indications via OAM cells following the indications received from a C Eth Protection Unit 50. The module 46 reports to a Control Protection Unit 52 the alarms received from the remote nodes through OAM ETH_AIS and ETH_RDI cells indicative of the impossibility of using one or more Logical L2 Ports. The module 46 further reports to the Control Protection Unit 52 the recovery of the correct operability of a Logical L2 port following an intervention on a remote apparatus. The module 46 receives from the Control Protection Unit 52 Protection/Working state indications of the Logical L2 ports to be sent to the Mw and Mp nodes.

For each logical port L2 the module 46 manages:

a timer t(L2) that counts the reception time of the last ETH_AIS/ETH_RDI cell, a timer w(L2) that counts the duration of the time window in which the ETH_AIS/ETH_RDI cells are received, a counter n(L2) that counts the ETH_AIS/ETH_RDI cell number received within that time window w(L2), a flag designated Flag(L2) that, if set, indicates that alarm report has been sent to the M Ethernet Protection Unit module.

Figure 22:
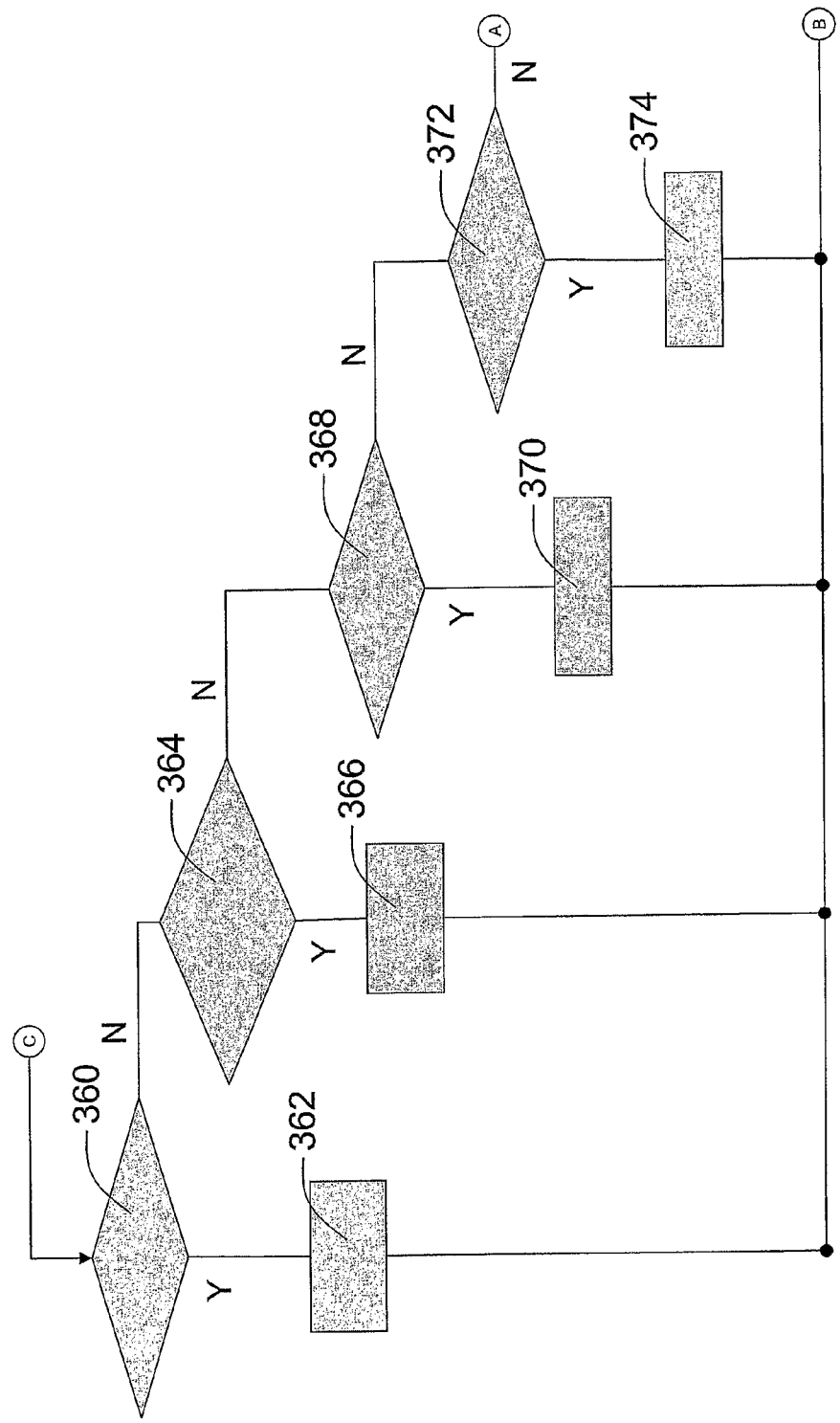
Figure 23:
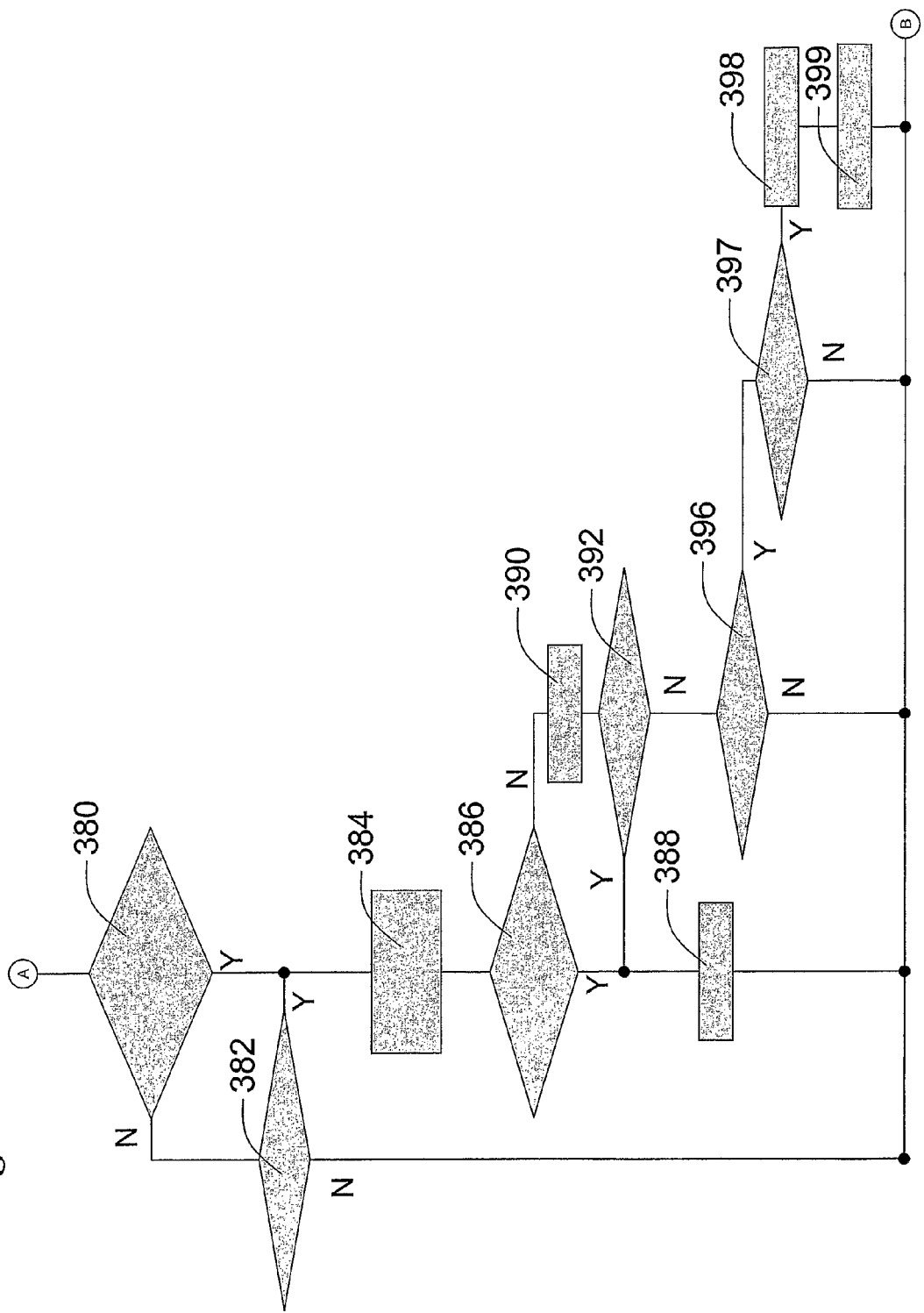
Figure 24:
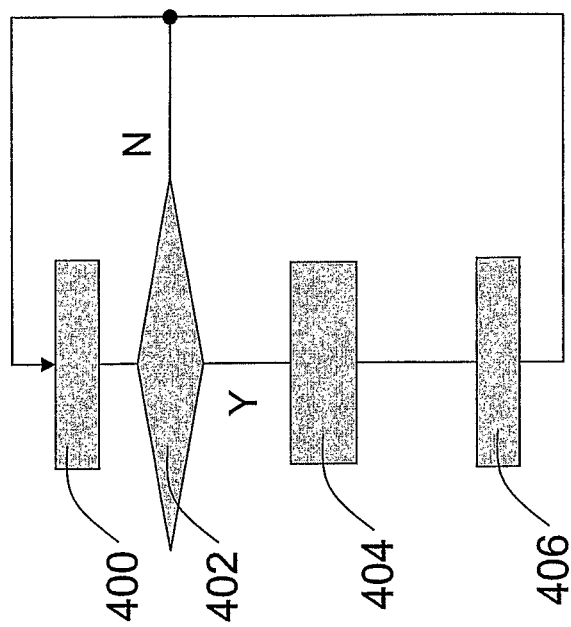

The operation scheme of the module 46 is described in FIGS. 22, 23 and 24.

Specifically:

upon reception (step 360) of an AIS signal report from the H Eth Protection Unit 50 relative to a Logical L2 port, in a step 362 the module 46 starts sending the OAM ETH_AIS cells on the Logical L2 port;

upon reception (step 364) of an AIS clear signal report from the H Ethernet Protection Unit module relative to a Logical L2 port, in a step 366 the module 46 discontinues sending of OAM ETH_AIS cells on the Logical L2 port;

upon reception (step 368) of a state change report from working to protection of a Logical L2 port from the Control Protection Unit 52, the module 46 sends, in a step 370, a state change report on the Logical L2 port towards the remote apparatus;

upon reception (step 372) of a state change report from protection to working of a Logical L2 port from the Control Protection Unit 52, the module 46 sends, in step 374, a state change report on the Logical L2 port towards the remote apparatus;

upon reception of a ETH_AIS (step 380) or ETH_RDI (step 382) cell on the logical port L2 at a time t preceded by a time interval T in which the ETH_AIS/RDI_AIS cells have not been received on that logical port (t(L2)>=T, which is checked in a step 386), after forwarding in a step 384 the AIS/RDI cells in question on all the logical L2 ports in the same bridge group of the logical L2 port on which the AID/RDI cell is received, in a step 388 the module 46 resets the timer t(L2), the timer w(L2), and initializes Flag(L2)=0 and n(L2)=1;

upon reception of a ETH_AIS/ETH_RDI cell (steps 380 and 382) on the logical port L2 at time t—not—preceded by a time interval T in which the ETH_AIS/RDI_AIS cells have not been received on that logical port (t(L2)<T, this being checked in a step 386), in a step 390 the module 46 resets the timer w(L2) and increases by one the counter n(L2), and if the timer w(L2)<=Z (checked in a step 392), n(L2)>=N (checked in a step 396) and the Flag(L2)=0 (checked in a step 388), in a step 398 the module 46 sends a fault report to the Control Protection Unit 52 on the Logical L2 port and sets Flag(L2)=1 in a step 399.

If the step 392 yields a positive outcome, the module 46 evolves to the step 388. If either of the steps 396 or 397 yields a negative outcome, the process ends (point B).

As illustrated in FIG. 24, this occurs in an asynchronous mode when a timer t(L2) exceeds the value Z, if the Flag(L2)=1 (alarm condition—checked in step 402) in a step 404 the module 46 reports to the Control Protection Unit 52 the recovery of the fault condition related to the L2 port and in step 406 sets Flag(L2)=0. The block 400 in FIG. 24 is indicative of a loop waiting step.

A H L2 Status Monitoring module 48 is in charge of verifying the correct operability of the Layer 2 HW/SW functionalities of the apparatus, including the H L2 Standard functions and the Physical layer ports. The module 48 includes a set of diagnostic tests that are performed in an asynchronous manner, in view of anomalies of the individual elements checked, possibly interacting with diagnostic modules within the HW of the H Standard L2 Function module 44. The module 48 maintains in a table the state of the possible faults.

Figure 25:
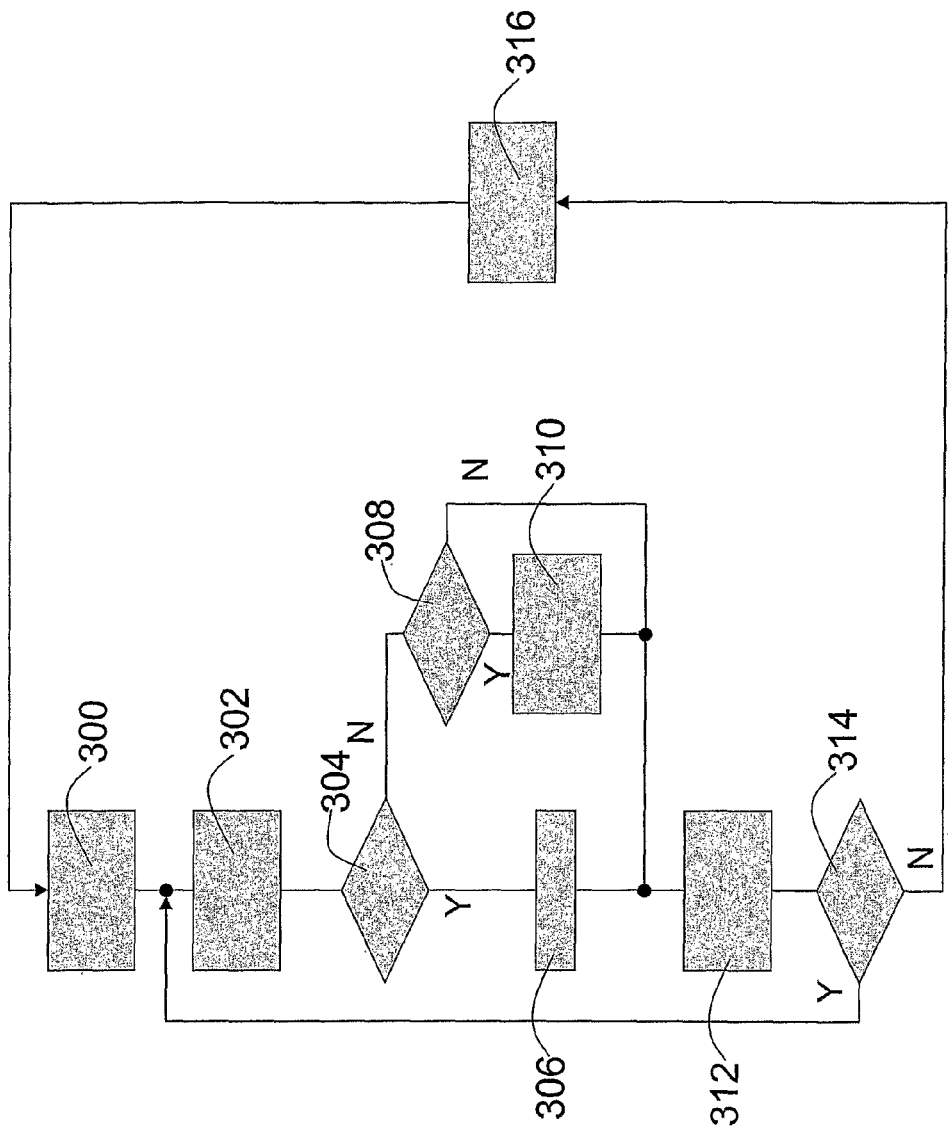

The operating scheme of the module 48 is described in FIG. 25.

Specifically, in view of an asynchronous report received (step 309) from the H Standard L2 Function 44 the module 48 sequentially performs (steps 302 to 314) the diagnostic tests and:

- if a given test (step 302) fails (positive outcome of the step 304), in a step 306 the module 48 reports the fault to the H Eth Protection Unit 50 and sets the flag related to that fault in the table that maintains the fault states;
- if the test (step 302) is successful (negative outcome of the step 304) and in the fault table the flag related to the fault is set (which is checked in a step 308), in a step 310 the module 48 resets the flag and reports to the H Eth Protection Unit 50 the fact that the fault was repaired.

As in FIGS. 12, 16, and 20, in FIG. 25, the blocks 312 and 314 are representative of the step-by-step increase of the test index and of the check that the tests are completed. The block 316 is representative of a waiting step.

A H Eth Protection Unit 50 is the module in charge of activating the fault report mechanisms following a layer 2 fault within the H apparatus.

Figure 26:
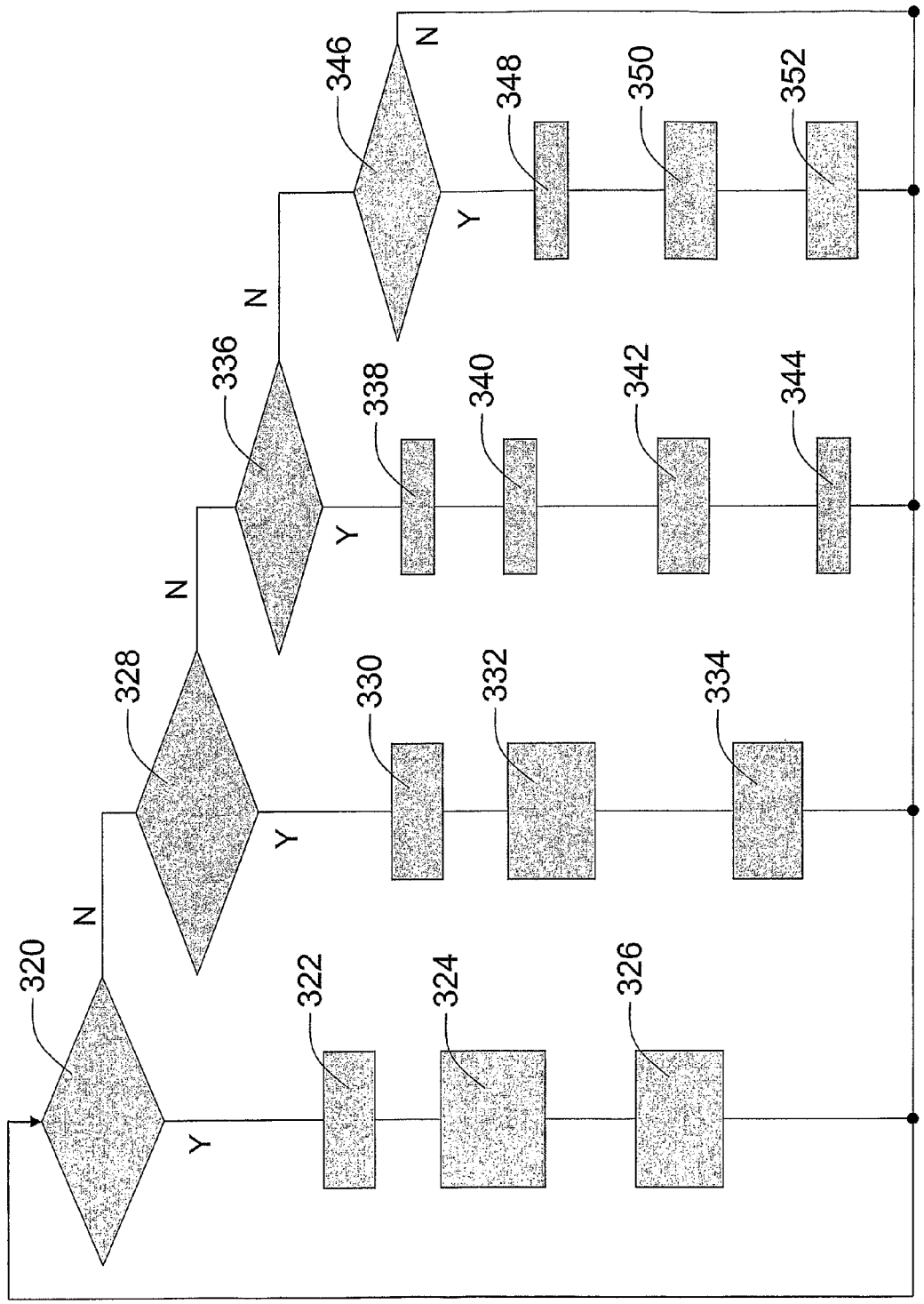

The functionality scheme of the unit 50 is described in FIG. 26.

Specifically, in the presence of:

- a fault report (step 320) on the H L2 Standard Function module 44 received from the H L2 Status Monitoring module 48, after evaluating in step 322 the impact on the L2 logical ports, in a step 324 the unit 50 requests the H Eth OAM function module 46 to send a ETH_AIS report downstream of the fault to inform the remote nodes of the fault on the Logical L2 port(s) affected by the fault; in a step 326 the unit 50 sends to the Control Protection Unit 52 a fault report of the Logical L2 port(s) on which the fault has an impact;
- a fault situation having been repaired, reported (step 328) as a H standard L2 function, after evaluating in a step 348 the impact on the L2 logical ports, in a step 332 the unit 50 requests the H Eth OAM function module 46 to discontinue sending of OAM ETH_AIS cells; in a step 334 the unit 50 sends to the Control Protection Unit 52 a resetting report for the Logical L2 port(s) on which the fault had an impact;
- a fault report (step 336) on the Physical layer Port received from the H L2 Status Monitoring module 48, after evaluating in step 338 the impact on the L2 logical ports, the unit 50 requests the H Eth OAM function module 46—in a step 340—to send a report through OAM ETH_RDI cells upstream of the fault on the Logical L2 port(s) connected to the Physical Layer Port affected by the fault and—in a step 342—to send a report through the OAM ETH_AIS cells downstream of the fault on the Logical L2 port(s) belonging to the same bridging domain of the Logical L2 port(s) affected by a fault; these reports inform the remote nodes of the fault condition. In a step 344 the unit 50 sends to the Control Protection Unit module a fault report of the Logical L2 port(s) on which the fault has an impact;
- a fault situation having been repaired (step 346), after evaluating in step 348 the impact on the L2 logical ports, in a step 350 the unit 50 requests the H Eth OAM function module 46 to discontinue sending OAM ETH_AIS cells; in a step 352 the unit 50 sends to the Control Protection Unit 52 a resetting report for the Logical L2 port(s) on which the fault had an impact.

The Control Protection Unit 52 is the module in charge of activating the protection mechanisms following an indication of local fault on the H apparatus received by the L2 Status monitoring module 48, or an indication of remote fault received by the Eth OAM function module 46. The unit 52 contains a table reporting the Logical L2 port pairs used alternately for protection with the relative state (working, protection, fail).

Figure 27:
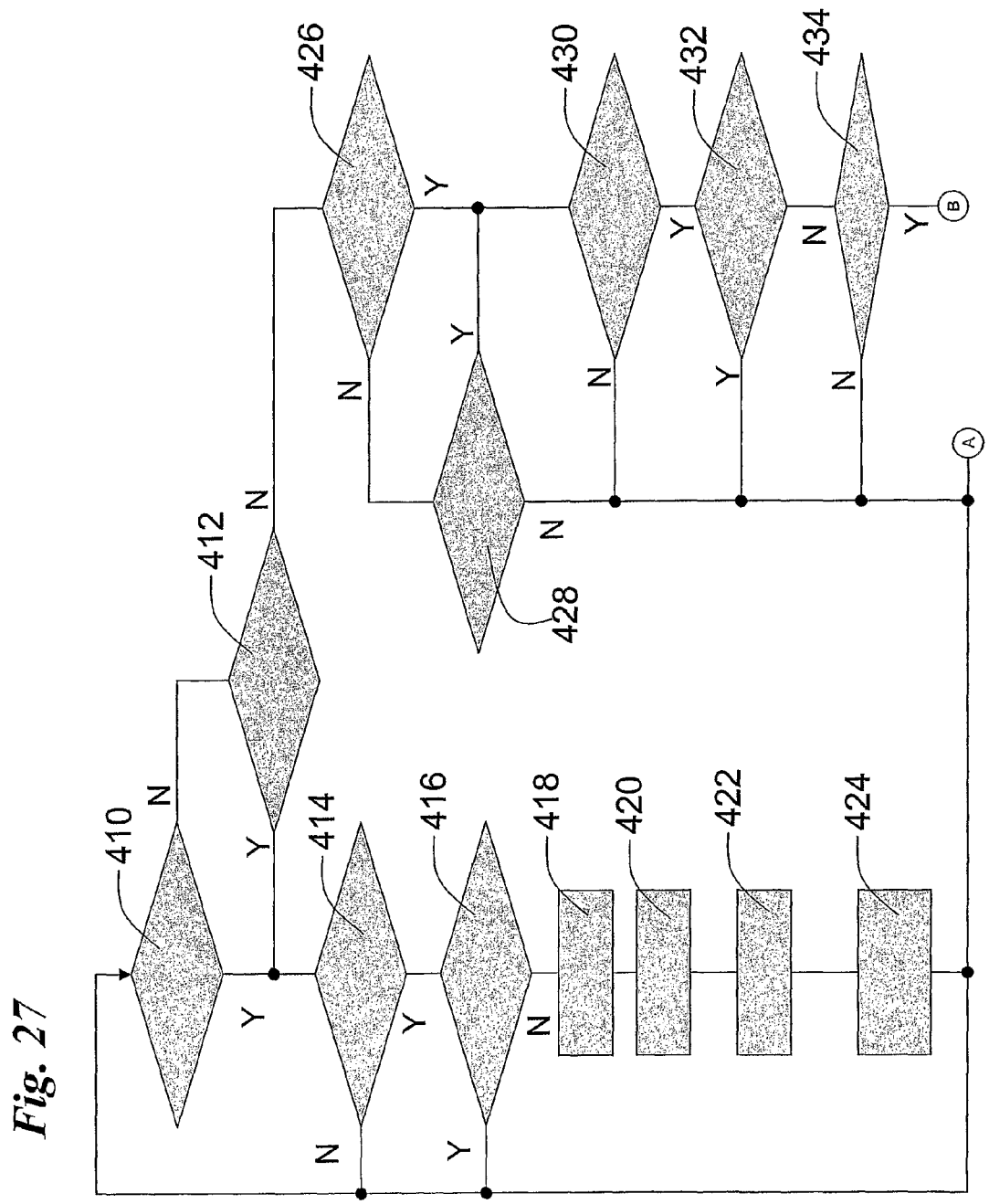
Figure 28:
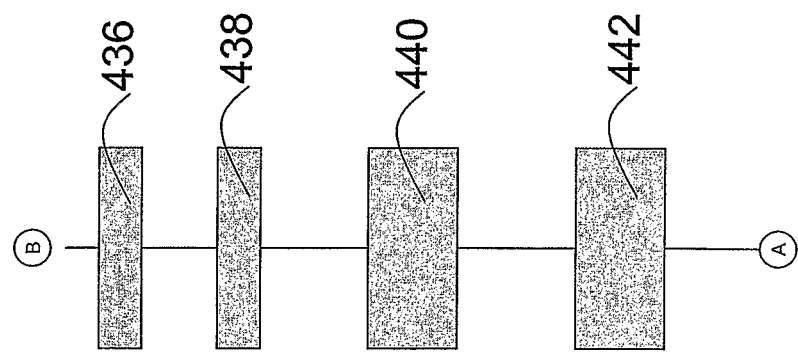

The operating scheme of the unit 52 is described in FIGS. 27 and 28.

Specifically, in the presence of:

- reception of a fault indication on a logical L2 port by the H Eth Protection Unit 50 (step 410) or by the H Eth OAM function module 46 (step 412), in a step 414 the unit 52 checks if a logical L2 protection port exists; in case this exists and is not affected by faults (which is checked in a step 416), in a step 418 the unit 52 disables the faulty logical L2 port, in step 420 enables the logical L2 protection port and requests the H ETH OAM function module 46 to report to the remote apparatuses the change of state from working to protection of the faulty Logical L2 port (step 422) and the change of state from protection to working of the Logical L2 port used for protection (step 424);
- reception of a resetting indication of a Logical L2 port from the H Eth Protection Unit 50 (step 426) or from the H Eth OAM function module 46 (step 428), the unit 52 checks in a step 430 if a logical L2 protection port exists and, in a step 432, if this is used at that moment; in this case in a step 434 the unit 52 applies a heuristic approach to decide if the Logical L2 protection port must be maintained active or if the initial configuration must be reset; in case the initial situation is to be reset, the unit 52 disables (step 436) the logical L2 protection port, enables (step 438) the logical L2 port on which the fault resetting has been reported and requests the H Eth OAM function module 46 to notify to the remote apparatuses the state change from working to protection of the Logical L2 protection port (step 440) and the state change from protection to working of the Logical L2 port on which the fault recovery has been reported (step 442).

Operation of the Layer 3 protection mechanism will now be described.

As regards the exchange procedure management in case of an IP Layer 3 fault (failover), the redundancy mechanism operates substantially by configuring the same MAC (Medium Access Control) Layer 2 address and IP Layer 3 address on the Imw and Imp interfaces.

Such an address assignment does not entail any appreciable problem because, thanks to the Ethernet Layer 2 protection mechanisms, only one of the two interfaces is from time to time active. In that ay the IP address and the relative MAC address assigned to the router interfaces that realize the redundancy on the LAN/VLAN/connection appear to the terminals or the client network terminals as a router that is always available and whose role is in fact played by the very router that is active at the moment.

If a fault occurs on the segment of the "working" LAN/VLAN/connection, namely the one connected to the router interface that plays the role of the active element in forwarding the Layer 3 traffic (Imw Interface), the Protection Switching Ethernet procedures trigger the exchange between the "working" segment W and the "protection" segment maintained up to that moment in a standby state.

If a fault occurs on the side of the communication infrastructure that has been "working" up to that moment, and that fault is to be ascribed to the Layer 3 processing functions of the traffic applied by Mw client homing router, the L3 Status Monitoring/Protection Unit functionalities previously described activate the Protection Switching Ethernet mechanisms. In that respect, it can be further noted that the impossibility for the Mw node to correctly forward traffic can be related to fault events that make unavailable other router interfaces to which the traffic is bound: exemplary of these are the router interfaces towards the network backbone. The monitoring of possible anomalies affecting these interfaces is therefore to be considered as a part of those functionalities that check the correctness the Mw router forwarding action and are performed by the same L3 Status Monitoring/Protection Unit elements.

By the time the Ethernet LAN/VLAN/connection segment (P in FIG. 5) previously maintained in the "protection" state is switched to the "working" state, also the related interfaces, in particular the interface to the router that is allotted the backup role, adopt the Layer 2 active state. At this point the backup router, that up to that moment was not active for IP traffic forwarding purposes, is connected to the LAN/VLAN/connection subnet and, through that subnet to various client systems for which it performs the traffic protection role. In particular, the output traffic from these systems continues to be forwarded towards the same IP address configured as a default gateway router for the LAN/VLAN to which they are connected. The destination MAC address is similarly unchanged, so that, as already noted, the switching process is totally transparent to the client systems. Reconfiguration as performed at the Layer 2 connectivity level by the Ethernet Protection Switching (PS) mechanisms leads the traffic sent by the client systems to reach the router interface that is now in the active state, so that the traffic is correctly managed and forwarded.

When passing to the active state, the interface on which the traffic is received acquires the MAC and IP addresses to which the client systems traffic is bound. Additionally, the router that before the switching step played the backup role has maintained through that step the contents of its routing tables duly updated, thus taking part in possible routing protocols active on the backbone network.

Concerning Layer 3 processing of the traffic from the network and bound towards the LAN/VLAN/connection and ultimately towards the client systems, the mechanism operates in the following way.

By the time the interface to be protected passes to the active state, the router detects the state change and, by applying the Ethernet Protection Switching procedure control, automatically installs in its own forwarding table a route corresponding to the subnet configured on that interface. That route is therefore distributed over the network through the dynamic routing protocols thus ensuring that the traffic to the client systems is routed towards the newly active router. Therefore, also the traffic to the LAN/VLAN/connection is correctly managed by means of the IP routing mechanisms in combination with the effect of the switching action realized by the Ethernet Protection Switching mechanisms.

As regards the operation of the Ethernet Protection Switching (PS) feature, the Ethernet layer reference network is described in FIG. 9.

FIG. 9, and FIGS. 10 and 11 as well, adopt the same formalism adopted in the figures of the Alcatel Technology White Paper already cited in the introductory portion of this description.

In particular, FIG. 9 describes, referring to the interaction between the CPE (user U), the H and Cn apparatus (network N), plus the Mw and, Mp apparatuses (access/edge nodes) how certain monitoring instances are created for each active Ethernet link.

In these figures of drawing, the triangles denoted ETH srv (i.e. Ethernet service) represent the maintenance logical entities (MEP). These entities are opened and closed in a single physical section between the H node and the primary and backup edge routers Mw/Mp.

Their closure should be, in principle, at the point in which the protection domain is closed. In the arrangement described herein this function is implemented in a virtual manner because the effective protection domain closure occurs at the IP layer.

In FIG. 9, the triangles denoted ETH span represent MEP logical entities that collect at a higher level the OAM information of one or more ETH srv entities.

In FIG. 10, the entities represented by the triangles designated ETH srv and ETH span are shown separately for the "working" edge node Mw and the "protection" backup edge node Mp, respectively.

FIG. 10 illustrates in detail the steps for activating the protection scheme of the arrangement described herein. These steps include:

I)—OAM report activation steps of the physical layer, ETH srv:
  the LINK FAULT local report functions for the terminations of each individual apparatus are activated (physical state of the up and down port, packet counters);
  information is gathered by a logical entity called MEP, able to offer a state information at a higher OAM layer;
II)—at the ETH layer span:
  the state information is collected by the lower layer (ETH srv) through the MIP logical entities that gather and filter lower layer state information
  the MIP entity is defined at a single physical port layer and can be associated to a single VLAN;
  the MIP state/s gathering of one/more ETH link defines the operative state/condition of an ETH span where the state can be operative state or non-operative, and operative condition means the absence/presence of alarms (ETH_AIS, ETH_RDI, ETH_CC);
  the ETH_span definition includes the level of the entity so defined: e.g. eight different levels or layers are possible.

In the lower portion of FIG. 11, the entities designated ETH span in FIG. 10 (for "working" and "protection" elements, respectively) are reproduced by way of direct reference. Additionally, service entities, namely ETH_service_w and ETH_service_p, are shown again for working and protection elements, respectively. The service entities in question represent the OAM state information collected from the respective associated ETH span entities (again for working and protection elements, respectively).

The state of each path (working or protection) is decided within the H node that sets the non-active path in a non-forwarding state as a function the alarm conditions.

If the H node is unable to supply the indications, in any case the terminal points of the ETH service level are informed about the non-operative state of any of the elements that compose the paths.

In that way the H node decides, on the basis of the OAM signalling received, the state of the section between the H node and the two distinct paths terminating at the routers Mw and Mp, respectively.

Usually, traffic continuity is realized through the node Mw on a VLAN configured for a given service. If a fault occurs, in a protection state the same VLAN is switched from standby to active on the node Mp.

In brief:

I)—in the normal protection state, the traffic is routed only over the normal path through the defined VLAN; the L2 logical interface of the related circuit is disabled on the protection side (the VLAN tag on the protection side is in the Non Forwarding State (NFS);

II)—in the active protection state, the traffic is switched, through the same VLAN tag, on the protection path only; the VLAN on the working side switches to NFS (the L2 logical interface is disabled) while on the protection path it switches to the Forwarding State FS (the L2 logical interface is enabled).

Network dimensioning for the working and protection connections can be different: in case the working connection is active, extra-traffic can be also transported whose transport is not guaranteed in the active protection state that is, when the protection connection is used.

The protection Force Switch condition is obtained by forcing the state exchange of the protection itself (transition from working to protection condition following an external command, either on the basis of a single protected flow and globally, without active alarm conditions. This command occurs by action external to the Control Protection Unit 52 of the H node (see FIG. 8).

The Lock out of the Protection condition provides for the possibility of disabling protection, either on the basis of a single protected entity and globally, so that the flow is always blocked on the branch or path defined as working irrespective of the active alarm conditions. This command occurs by action external to the Control Protection Unit 52 of the H node.

The Wait to Restore condition provides for the opportunity to set a timer (from hundreds of ms to tens of seconds), either on the basis of a single protected entity or globally, so that the possibility to return to the original data flow path is delayed. In this way it will be possible to avoid undesired "bouncing" or "flapping" phenomena between the working and protection states deriving from non-stable alarms. This command occurs again by action external to the Control Protection Unit 52 of the H node.

Those of skill in the art will appreciate that the exemplary arrangement described in the foregoing by referring to a primary "working" node Mw having associated a single secondary "protection" or backup node Mp can be extended to the case of k machines/nodes including one node Mw with active interface and k−1 backup nodes Mp(1), . . . , Mp(k−1) kept in standby condition as shown in FIG. 29.

In this case the protection is configured as 1:n, as described in the ITU G.842 recommendation for the circuit transmission systems, but applied to the OSI L2/L3 layers as previously described.

Referring to FIG. 29 there exists a primary connection W, realized according to logical paths, between the traffic aggregation DSLAM node of the users U and the reference Mw node that realizes the offered service. All the logical interfaces that realize the different services are routed on the primary logical path (working) W.

When a fault condition occurs for which the protection mechanism described herein is activated itself, k−1 alternative service providers (Mp(1), . . . , Mp(k−1) backup nodes) associated to a corresponding number of alternative paths.

When a logical working interface is disabled, k−1 alternative logical interfaces are available to be enabled according to at least two alternative modes:

at overflow: the first logical interface associated to an entity that supplies the service requested (namely, Mp(n) node), is tagged as available and allotted to the resource that requires protection. The availability for protection of a logical interface is directly updated by the Mp(1), . . . , Mp(k−1)nodes;

predefined: the protection provides for a priority configuration for the use of protection resources.

The above mentioned priority can be configured in at least two ways:

manually, or according to network parameters, such as the M machine payload, etc A report of the protection availability conditions on the different branches that realize the K−1 protection branches is provided for, starting from the node Mw towards the node H on the root of the OAM report, ETH_pr_st. This admits at least two possible states (ON, to indicate the possibility to realize the protection, and OFF, to inhibit it). The report occurs for each logical interface configured as protected.

The arrangement described herein allows, through the L2 layer logical interface, to switch to a backup path in a very short time (for example comparable to the operation times of SDH transmission systems) following a malfunction condition of the physical layer directly connected to the Ethernet port or a malfunction condition of the L3 layer.

The solution is extended to the L1 layer logical interface malfunction when the L2 packet system is interfaced with a transmission system providing for electrical signal processing that behaves like a pure Ethernet layer (management of Ethernet logical interfaces).

Similarly to what has been described previously, the logical interfaces of the port are disabled following the AIS and RDI reports of the transmission systems, that is, the transmission system is equipped with an additional module that, upon reception of a physical layer AIS signal, generates OAM ETH_AIS cells for each logical interface affected by the fault and, similarly, upon reception of a physical layer RDI signal, generates OAM ETH_RDI cells for each logical interface affected by the fault.

Consequently, without prejudice to the underlying principles of the invention, the details and the embodiments may vary, even appreciably, with reference to what has been described by way of example only, without departing from the scope of the invention as defined by the annexed claims.

The invention claimed is:

1. A method of providing user access to a communication network providing communication services, said access being via at least one edge node and a packet network connecting said users to said at least one edge node, comprising:

equipping said packet network with operation and maintenance procedures for preserving access connectivity over said packet network, wherein the packet network comprises a physical connectivity layer, a link connectivity layer, and a service connectivity layer, and wherein the operation and maintenance procedures are active on the link connectivity layer;

associating with said at least one edge node at least one backup edge node to provide backup access to said communication network providing said services via the at least one backup edge node, wherein the at least one edge node and the at least one backup edge node are distinct, and share common IP and MAC addresses; and in the presence of at least partial failure detected on the physical connectivity layer or the service connectivity layer involving said at least one edge node, selectively connecting, via the link connectivity layer, said users and said at least one backup edge node by applying said operation and maintenance procedures, wherein said operation and maintenance procedures are configured to be selectively enabled or disabled on the basis of at least a single protected entity and include using said common IP and MAC addresses to provide seamless user access to the communication network over said packet network via the at least one backup node.

2. The method of claim 1, wherein said packet network is an ethernet.

3. The method of claim 1, comprising the steps of:
providing in said packet network a primary connection path toward said at least one edge node; and
providing in said packet network a backup connection path toward said at least one backup edge node, wherein said primary connection path and a backup connection path are distinct from each other.

4. The method of claim 1, comprising the steps of:
associating with said at least one edge node a plurality of said backup edge nodes to provide access to said communication network providing said services, and
in the presence of failure of said at least one edge node connecting said users to at least one backup edge node out of said plurality of backup edge nodes.

5. A system for providing user access to a communication network providing communication services, access being via at least one edge node of said communication network, comprising:
a packet network connecting said users to said at least one edge node, said packet network equipped with operation and maintenance procedures for preserving access connectivity over said packet network;
a physical connectivity layer;
a link connectivity layer, comprising the operation and maintenance procedures;
a service connectivity layer; and
at least one backup edge node distinct from said at least one edge node to provide backup access to said communication network providing said services, whereby, in the presence of at least partial failure detected on the physical connectivity layer or the service connectivity layer involving said at least one edge node, said users and said at least one backup edge node are selectively connectable by applying said operation and maintenance procedures services via the link connectivity layer, wherein the at least one edge node and the at least one backup edge node are distinct, and share common IP and MAC addresses and said operation and maintenance procedures are configured to be selectively enabled or disabled on the basis of at least a single protected entity and include using said common IP and MAC addresses to provide seamless user access to the communication network over said packet network via the at least one backup node.

6. The system of claim 5, wherein said packet network is an ethernet.

7. The system of claim 5, comprising a plurality of said backup edge nodes associated with said at least one edge node to provide access to said communication network providing said services, whereby, in the presence of failure of said at least one edge node, said users are connectable to at least one backup edge node out of said plurality of backup edge nodes.

8. A communication network for providing communication services to users comprising a system for providing user access to a communication network providing communication services, access being via at least one edge node of said communication network, comprising:
a packet network connecting said users to said at least one edge node, said packet network equipped with operation and maintenance procedures for preserving access connectivity over said packet network;
a physical connectivity layer;
a link connectivity layer, comprising the operation and maintenance procedures;
a service connectivity layer; and
at least one backup edge node distinct from said at least one edge node to provide backup access to said communication network providing said services, whereby, in the presence of at least partial failure detected on the physical connectivity layer or the service connectivity layer involving said at least one edge node, said users and said at least one backup edge node are selectively connectable by applying said operation and maintenance procedures services via the link connectivity layer, wherein the at least one edge node and the at least one backup edge node are distinct, and share common IP and MAC addresses and said operation and maintenance procedures are configured to be selectively enabled or disabled on the basis of at least a single protected entity and include using said common address to provide seamless user access to the communication network over said packet network via the at least one backup node.

9. A non-transitory computer-readable medium containing instructions that, when executed by a computer, perform a method of providing user access to a communication network providing communication services, said access being via at least one edge node and a packet network connecting said users to said at least one edge node, comprising the steps of:
equipping said packet network with a physical connectivity layer, a link connectivity layer, and a service connectivity layer;
equipping said packet network with operation and maintenance procedures for preserving access connectivity over said packet network, wherein the operation and maintenance procedures are active on the link connectivity layer;
associating with said at least one edge node at least one backup edge node to provide backup access to said communication network providing said services via the at least one backup edge node, wherein the at least one edge node and the at least one backup edge node are distinct, and share common IP and MAC addresses; and
in the presence of at least partial failure detected on the physical connectivity layer or the service connectivity layer involving said at least one edge node, selectively connecting, via the link connectivity layer, said users and said at least one backup edge node by applying said operation and maintenance procedures, wherein said operation and maintenance procedures are configured to be selectively enabled or disabled on the basis of at least a single protected entity and include using said common IP and MAC address to provide seamless user access to the communication network over said packet network via the at least one backup node.

* * * * *